(12) United States Patent
Voorheis et al.

(10) Patent No.: US 6,960,629 B2
(45) Date of Patent: Nov. 1, 2005

(54) USE OF A METALLIC MERCAPTOTHIAZOLE OR METALLIC MERCAPTOBENZOTHIAZOLE IN GOLF BALL COMPOSITIONS

(75) Inventors: Peter R. Voorheis, New Bedford, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 114 days.

(21) Appl. No.: 10/437,386

(22) Filed: May 14, 2003

(65) Prior Publication Data

US 2004/0230005 A1 Nov. 18, 2004

(51) Int. Cl.$^7$ .............................................. A63B 37/06
(52) U.S. Cl. ...................... 525/256; 525/261; 525/274; 473/372; 473/373
(58) Field of Search ................................ 525/256, 261, 525/274; 473/372, 373

(56) References Cited

U.S. PATENT DOCUMENTS

| | | | |
|---|---|---|---|
| 4,715,607 A | 12/1987 | Llort et al. | 473/372 |
| 4,974,852 A * | 12/1990 | Hiraoka et al. | 473/372 |
| 5,252,652 A | 10/1993 | Egashira et al. | 524/392 |
| 5,605,968 A | 2/1997 | Egashira et al. | 525/221 |
| 5,697,856 A | 12/1997 | Moriyama et al. | 473/374 |
| 5,733,206 A | 3/1998 | Nesbitt et al. | 473/377 |
| 5,776,012 A | 7/1998 | Moriyama et al. | 473/372 |
| 5,816,944 A | 10/1998 | Asakura et al. | 473/372 |
| 5,919,101 A | 7/1999 | Yokota et al. | 473/374 |
| 5,929,171 A | 7/1999 | Sano et al. | 525/261 |
| 5,948,862 A * | 9/1999 | Sano et al. | 525/89 |
| 5,976,443 A | 11/1999 | Nesbitt et al. | 264/250 |
| 6,121,357 A | 9/2000 | Yokota | 524/406 |
| 6,162,135 A | 12/2000 | Bulpett et al. | 473/373 |
| 6,184,301 B1 | 2/2001 | Shindo et al. | 525/261 |
| 6,241,625 B1 | 6/2001 | Yokota et al. | 473/373 |
| 6,291,592 B1 | 9/2001 | Bulpett et al. | 525/248 |
| 6,417,278 B1 | 7/2002 | Ladd et al. | 525/193 |
| 6,458,895 B1 | 10/2002 | Wrigley et al. | 525/248 |
| 6,465,578 B1 | 10/2002 | Bissonnette et al. | 525/261 |
| 6,468,168 B1 | 10/2002 | Nesbitt et al. | 473/357 |
| 6,475,417 B2 | 11/2002 | Nesbitt et al. | 264/134 |
| 6,569,037 B2 * | 5/2003 | Ichikawa et al. | 473/378 |
| 2003/0073512 A1 * | 4/2003 | Kim | 473/351 |

OTHER PUBLICATIONS

Thain, Science and Golf IV; Jul. 2002, pp. 319–327.*
Chemical Abstract 68:69951; 1968.*

* cited by examiner

*Primary Examiner*—David J. Buttner
(74) *Attorney, Agent, or Firm*—Swidler Berlin LLP

(57) ABSTRACT

The present invention is directed to a golf ball having at least one of a center, cover, or intermediate layer that includes a reaction product that includes a resilient polymer component, a free radical source, at one of a metallic mercaptothiazole and optionally one or more of a cis-to-trans catalyst, a crosslinking agent, or a filler.

42 Claims, 1 Drawing Sheet

USE OF A METALLIC MERCAPTOTHIAZOLE OR METALLIC MERCAPTOBENZOTHIAZOLE IN GOLF BALL COMPOSITIONS

FIELD OF THE INVENTION

The present invention relates to the use of a metallic mercaptothiazole in golf ball compositions. In particular, the invention relates to resilient golf balls and portions thereof including compositions formed from a reaction product including at least one metallic mercaptothiazole, and methods for making same.

BACKGROUND OF THE INVENTION

Conventional golf balls can be divided into several general classes: (a) solid golf balls having one or more layers, and (b) wound golf balls. Solid golf balls include one-piece balls, which are easy to construct and relatively inexpensive, but have poor playing characteristics and are thus generally limited for use as range balls. Two-piece balls are constructed with a generally solid core and a cover and are generally popular with recreational golfers because they are very durable and provide maximum distance. Balls having a two-piece construction are commonly formed of a polymeric core encased by a cover. Solid golf balls also include multi-layer golf balls that are comprised of a solid core of one or more layers and/or a cover of one or more layers. These balls are regarded as having an extended range of playing characteristics. These balls are generally easy to manufacture, but are regarded as having limited playing characteristics.

A variety of golf balls designed to provide a wide range of playing characteristics, i.e., the compression, velocity, "feel," and spin, that can be optimized for various playing ability, are known in the prior art. Typical golf ball construction includes a core formed from polybutadiene that is chemically crosslinked with zinc diacrylate and/or other similar crosslinking agents. In addition, golf ball formulations have included sulfur-based components in an effort to provide improved golf balls, as discussed below.

U.S. Pat. No. 5,776,012 discloses a solid golf ball having a core and a cover. The core is formed from vulcanized molded material of a rubber composition that contains a number of materials, including a base rubber, a metal salt of α,β-unsaturated carboxylic acid, an organic peroxide and an organosulfur compound and/or a metal-containing organosulfur compound that is present from 0.3 to 2.3 parts by weight based on 100 parts by weight of base rubber. The further discloses particular organosulfur compound and metal-containing organosulfur compounds, including diphenyl disulfide, dixylyl disulfide, pentachlorothiophenol ("PCTP"), thiobenzoic acid, morpholine disulfide, as well as zinc salts of thiophenols and thiocarboxylic acids.

U.S. Pat. No. 6,184,301 discloses solid golf balls having a solid core and cover, where the core is formed from a base material that contains several materials, including a base rubber, an unsaturated carboxylic acid or metal salt thereof, and a sulfur halide that is present from 0.03 to 0.5 parts by weight based on 100 parts by weight of the base rubber. Particular sulfur halides include disulfur dichloride, sulfur dichloride, sulfur monochloride, thionyl chloride and sulfur bromide.

U.S. Pat. No. 5,929,171 discloses a solid golf ball having a core and cover formed on the core, where the core is formed from a rubber composition that includes a base rubber, and an organosulfur compound that is present from 0.05 to 5.0 parts by weight based on 100 parts by weight of the rubber. The particular organosulfur compounds are 4-methylphenol, bis(4-methacryloylthiopehnyl)sulfide, 4,4'-dithiodibenzene thiol, 4,4'-dibroimodiphenylsulfide, 2-mercaptothiazoline, or mixtures thereof.

U.S. Pat. No. 6,241,625 discloses a solid golf ball having a core and cover, where the core is formed from vulcanized rubber that includes a base rubber, an α,β-unsaturated carboxylic acid or metal salt thereof, an organic peroxide and a sulfide that is present from 0.2 to 1.0 parts by weight per 100 parts by weight of the base rubber. The particular sulfides include diphenyl monosulfides, diphenyl disulfides, diphenyl polysulfides, and morpholine disulfide.

U.S. Pat. No. 6,121,357 discloses a solid golf ball having a core and cover formed on the core, where the core is obtained by vulcanizing a rubber composition comprising a base rubber, a co-crosslinking agent, a vulcanization initiator (such as an organic peroxide), and a filler. The co-crosslinking agent can be a monovalent or divalent metal salt of an α,β-unsaturated carboxylic acid and the filler can include an organic sulfide, such as diphenyl polysulfide, dibenzylpolysulfide, dibenzoyl polysulfide, dibenzothiazoyl polysulfide, 4-methyl phenol sulfide and 4-ethyl phenol sulfide, which can be present from 0.05 to 5.0 parts by weight based on 100 parts by weight of the base rubber.

U.S. Pat. No. 5,919,101 discloses a solid golf ball having a core and cover formed on the core, where the core is formed from a rubber composition having 0.05 to 5 parts by weight of an organic sulfide compound, based on 100 parts by weight of a base rubber. The organic sulfides include polysulfides having 2 to 4 sulfur atoms, such diphenyl polysulfide, dibenzyl polysulfide, dibenzoyl polysulfide, dibenzothiazoyl polysulfide, dithiobenzoyl polysulfide and a tetraalkylthiuram sulfide.

U.S. Pat. No. 5,816,944 discloses a solid golf ball having a core and cover covering the core, where the core is composed of a vulcanized molded material including a base rubber, a metal salt of α,β-unsaturated carboxylic acid, an organic peroxide, an organosulfur and/or metal-containing organosulfur compound, and a filler. The organic compound includes diphenyl disulfide, dixylyl disulfide, pentachlorothiophenol, thiobenzoic acid, morpholine disulfide, as well as zinc salts of thiophenols and thiocarboxylic acids.

U.S. Pat. No. 5,605,968 discloses a solid golf ball having a core and cover, where the core is made of a rubber composition including a base rubber, a metal salt of an unsaturated carboxylic acid, and a peroxide. In a preferred embodiment, pentachlorothiophenol or a metal salt thereof is added to the composition.

U.S. Pat. No. 5,252,652 discloses a solid golf ball where the golf ball core is formed from a rubber composition having a base rubber, an unsaturated carboxylic acid metal salt and an organic sulfur compound and/or a metal salt thereof. The organic sulfur compounds include thiophenols, such as pentachlorothiophenol, 4-butyl-o-thiocresol, 4-t-butyl-p-thiocresol, and 2-benzamideothiophenol; and sulfides, such as dixylyl disulfide, di(o-benzamidophenyl) disulfide and alkylated phenol sulfides. The metal-containing organic sulfur compounds include zinc salts of the above thiophenols and thiocarboxylic acids.

U.S. Pat. No. 5,697,856 discloses a solid golf ball having a core and cover, where the core includes a vulcanizing agent, a filler, an organic peroxide, and an organosulfur compound. The organosulfur compound can be diphenyl disulfide, dixylyl disulfide, ditolyl disulfide.

U.S. Pat. Nos. 6,468,168 discloses a golf ball having a solid core that may be formed from the use of sulfur bearing accelerators for rubber vulcanization, such as benzothiazyl disulfide and 2-mercaptobenzothiazole.

However, it is desirable to have golf ball compositions that use lower amounts of crosslinker, such as monoacrylate, diacrylate, triacrylate and their metallic derivatives, particularly for lower cost formulations or in formulations where lower levels of crosslinkers are preferred, without compromising golf ball playability. The compositions of the present invention provided golf balls with increased compression without the use of additional crosslinkers, such as zinc diacrylate.

SUMMARY OF THE INVENTION

The present invention encompasses a golf ball comprising a reaction product wherein the reaction product comprises a resilient polymer component; a free radical source; and at least one of a metallic mercaptothiazole having the general formula I:

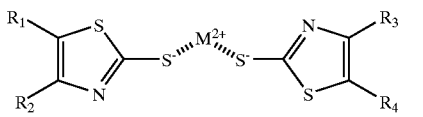

wherein $R_1$, $R_2$, $R_3$, and $R_4$ are each independently hydrogen, unsubstituted or substituted alkyl, unsubstituted or substituted cycloalkyl, unsubstituted or substituted aryl, unsubstituted or substituted heteroaryl, unsubstituted or substituted alkoxy, alkylester, amido, amino, cyano, thioalkyl, hydroxyl, halogen, aldehyde, or alkylcarbonyl; and M is selected from the group consisting of Zn, Cu, Ni, Co, Fe, Mn, Cr, V, Ti, Cd, Pd, Rh, Ru, Mo, Nb, Zr, Mg, Ca, Sr, Ba, Ge, Sn, Pb and Bi.

In one embodiment, M is Zn, Cu, Mg, Ca, Sn, Mn, or Cd. In another embodiment, the metallic mercaptothiazole is zinc mercaptothiazole. In yet another embodiment, the metallic mercaptothiazole is present in an amount from about 0.01 pph to about 50 pph. Preferably, the metallic mercaptothiazole is present in an amount from about 1 pph to about 5 pph.

In one embodiment, the golf ball comprises one or more of a core, intermediate layer and cover, wherein the reaction product is disposed in at least a portion of the core, intermediate layer, cover, or a combination thereof. In another embodiment, the reaction product further comprises one or more crosslinking agents or fillers. In one embodiment, the crosslinking agent is a metallic salt of an unsaturated acid monomer or monocarboxylic acid. In another embodiment, the metallic salt is selected from the group consisting of zinc acrylate, zinc diacrylate, zinc methacrylate, zinc dimethacrylate and mixtures thereof. In a preferred embodiment, the crosslinking agent is zinc diacrylate. In another embodiment, the crosslinker is present from about 10 percent to about 50 percent of the resilient polymer component. In a preferred embodiment, the crosslinker is present from about 20 pph to about 40 pph.

In one embodiment, the cover comprises one or more homopolymeric or copolymeric cover materials selected from the group consisting of thermoset polyurethane, thermoplastic polyurethane, thermoset polyurea, thermoplastic polyurea, thermoset elastomer, thermoplastic elastomer and thermoplastic ionomer. In another embodiment, the golf ball core has an Atti compression of at least about 40. In yet another embodiment, the golf ball has a coefficient of restitution of at least about 0.78.

In one embodiment, the golf ball has a ball spin rate of about 2500 rpm to about 4000 rpm when the golf ball is hit with a golf driver. In another embodiment, the golf ball has a ball spin rate of about 6,500 rpm to about 10,000 rpm when the golf ball is hit with an 8-iron.

In one embodiment, the flexural modulus of the intermediate layer is about 2000 psi to about 200,000 psi and the flexural modulus of the cover is from about 5000 psi to about 100,000 psi. In another embodiment, the core has a hardness of about 15 Shore A or greater, the intermediate layer has a hardness of about 30 Shore D or greater, and the cover has a hardness of 70 Shore D or less.

In one embodiment, the filler comprises at least one density adjusting filler. In a preferred embodiment, the density adjusting filler is a metal powder or metal oxide, or foaming agent.

In one embodiment, the resilient polymer component is selected from the group consisting of a cis-polybutadiene, trans-polybutadiene, cis-isoprene, trans-isoprene, thermoplastic copolyester block copolymer; dynamically vulcanized thermoplastic elastomer; hydrogenated styrene-butadiene elastomer, non-hydrogenated styrene-butadiene elastomer; thermoplastic polyurethane; polymers made using a metallocene catalyst; ethylene propylenediene monomer; ethylene propylene rubber; or mixtures thereof. In another embodiment, the resilient polymer component comprises greater than 90% cis-polybutadiene. In a preferred embodiment, the resilient polymer component comprises from about 95% to about 99% cis-polybutadiene. In yet another embodiment, the resilient polymer component has a Mooney viscosity from about 30 to about 120.

In one embodiment, the reaction product further comprises a cis-to-trans catalyst. In another embodiment, the reaction product further comprises an accelerator to enhance the cis-to-trans catalyst. In yet another embodiment, the cis-to-trans catalyst is present in an amount from about 0.1 to about 25 parts per hundred of polybutadiene and the cis-to-trans catalyst is present in an amount from about 0.1 pph to about 100 pph.

In one embodiment, the cis-to-trans catalyst is at least one of a metal-containing or nonmetal organosulfur component, a Group VIA component, an inorganic sulfide, or a substituted or unsubstituted aromatic organic compound. In a preferred embodiment, the organosulfur component is 4,4'-diphenyl disulfide; 4,4'-diphenyl acetylene, 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl) disulfide; 2,2'-bis(6-aminonaphthyl)disulfide; 2,2'-bis(7-aminonaphthyl)disulfide; 2,2'-bis(8-aminonaphthyl) disulfide; 1,1'-bis(2-aminonaphthyl)disulfide; 1,1'-bis(3-aminonaphthyl)disulfide; 1,1'-bis(3-aminonaphthyl) disulfide; 1,1'-bis(4-aminonaphthyl)disulfide; 1,1'-bis(5-aminonaphthyl)disulfide; 1,1'-bis(6-aminonaphthyl) disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis (2,5-dichlorophenyl)disulfide; bis(3,5-dichlorophenyl) disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4carbamoylphenyl)disulfide; 1,1'-dinaphthyl disulfide; 2,2'-dinaphthyl disulfide; 1,2'-dinaphthyl disulfide; 2,2'-bis(1-chlorodinapthyl)disulfide 2,2'-bis(1-bromonaphthyl)disulfide; 1,1'-bis(2-chloronaphthyl)disulfide; 2,2'-bis(1-cyanonaphtyl)disulfide; 2,2'-bis(1-acetylnaphthyl)disulfide; and the like; or a mixture thereof. In another preferred embodiment, the organosulfur component is 4,4'-diphenyl disulfide, 4,4'-ditolyl disulfide, or 2,2'-benzamido diphenyl disulfide, or a mixture thereof.

In one embodiment, the organosulfur component is a compound of general formula III:

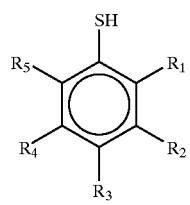

III where $R_1-R_5$ is selected from the group consiting of $C_1-C_8$ alkyl groups; halogen groups; thiol groups (—SH), carboxylated groups; sulfonated groups; and hydrogen. In a preferred embodiment, the organosulfur component is selected from the group consisting of pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and zinc salts thereof. In yet another embodiment, the at least one organosulfur component is substantially free of metal.

In one embodiment, the inorganic sulfide component is selected from the group consisting of sulfide analogs of titanium, manganese, iron, calcium, cobalt, molybdenum, tungsten, copper, selenium, yttrium, zinc, tin, strontium, barium, vanadium, chromium, nickel, copper, zinc, cadmium, and bismuth. In another embodiment, the metal-containing organosulfur component is a metal analog of diethyldithiocarbamate, diamyldithiocarbamate, dimethyldithiocarbamate, or mixtures thereof, wherein the metal is cadmium, copper, lead, tellurium, zinc, tin, nickel, paladium, platinum, titanium, vanadium, chromium, or zirconium.

In one embodiment, the substituted or unsubstituted aromatic organic compound has the formula $(R_1)_x$—$R_3$—M—$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M is an azo group, acetylene group, or a metal component.

The present invention also encompasses a method of manufacturing golf balls comprising providing a core; optionally providing an intermediate layer disposed outside the core; and providing at least one cover over the core and optional intermediate layer, wherein at least one of the cover, the core, and the optional intermediate layer comprises at least one layer formed from a reaction product wherein the reaction product comprises a resilient polymer component; a free radical source; and at least one of a metallic mercaptothiazole having the general formula I:

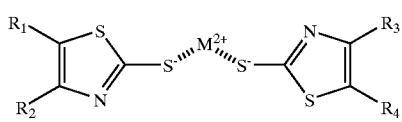

I wherein $R_1$, $R_2$, $R_3$, and $R_4$ are each independently hydrogen, unsubstituted or substituted alkyl, unsubstituted or substituted cycloalkyl, unsubstituted or substituted aryl, unsubstituted or substituted heteroaryl, unsubstituted or substituted alkoxy, alkylester, amido, amino, cyano, thioalkyl, hydroxyl, halogen, aldehyde, or alkylcarbonyl; and M is selected from the group consisting of Zn, Cu, Ni, Co, Fe, Mn, Cr, V, Ti, Cd, Pd, Rh, Ru, Mo, Nb, Zr, Mg, Ca, Sr, Ba, Ge, Sn, Pb and Bi.

The present invention also encompasses a golf ball having at least one layer that includes a reaction product comprising a resilient polymer component having polybutadiene; a free radical source; zinc pentachlorothiophenol; and zinc mercaptothiazole.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
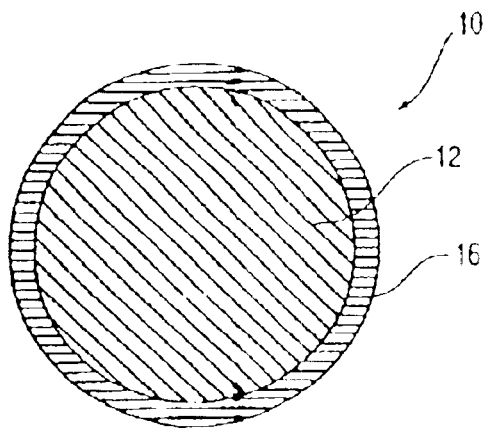
FIG. 1 is a cross-sectional view of a two-piece golf ball having a cover and a core according to the invention.

The present invention relates to one-piece golf balls, two-piece golf balls, or multilayer golf balls having a center, at least one intermediate layer disposed concentrically adjacent to the center, and a cover. The invention also relates to golf balls having a double core, a multi-layer core, a double cover, a multi-layer cover or more than one intermediate layer. At least one portion of the golf ball, i.e., one of the center, cover(s), or intermediate layer(s), includes a reaction product that includes a resilient polymer component; a free radical source; at least one of a metallic mercaptothiazole having the general formula I:

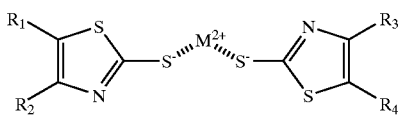

wherein $R_1$, $R_2$, $R_3$, and $R_4$ are each independently hydrogen, unsubstituted or substituted alkyl, unsubstituted or substituted cycloalkyl, unsubstituted or substituted aryl, unsubstituted or substituted heteroaryl, unsubstituted or substituted alkoxy, alkylester, amido, amino, cyano, thioalkyl, hydroxyl, halogen, aldehyde, or alkylcarbonyl; and M is selected from the group consisting of Zn, Cu, Ni, Co, Fe, Mn, Cr, V, Ti, Cd, Pd, Rh, Ru, Mo, Nb, Zr, Mg, Ca, Sr, Ba, Ge, Sn, Pb and Bi; or a metallic mercaptobenzothiazole having the general formula II:

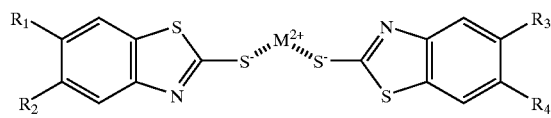

wherein $R_1$, $R_2$, $R_3$, and $R_4$ are each independently hydrogen, unsubstituted or substituted alkyl, unsubstituted or substituted cycloalkyl, unsubstituted or substituted aryl, unsubstituted or substituted heteroaryl, unsubstituted or substituted alkoxy, alkylester, amido, amino, cyano, thioalkyl, hydroxyl, halogen, aldehyde, or alkylcarbonyl; and M is selected from the group consisting of Zn, Cu, Ni, Co, Fe, Mn, Cr, V, Ti, Cd, Pd, Rh, Ru, Mo, Nb, Zr, Mg, Ca, Sr, Ba, Ge, Sn, Pb and Bi;

and optionally one or more of a cis-to-trans catalyst, crosslinking agent, a filler, or other additive.

The present invention encompasses all optical isomers and racemic forms of the compounds disclosed and claimed herein. The formulas of the compounds shown herein are intended to encompass all possible optical isomers of the compounds so depicted.

The present invention also encompasses metallic mercaptiothiazole compounds and metallic mercaptobenzolthiazole compounds that contain a divalent or trivalent metal. Accordingly, the metallic mercaptiothiazole compounds or metallic mercaptobenzolthiazole compounds can also contain Al, Ga, In or Tl.

The metallic mercaptothiazole compounds of formula I and metallic mercaptobenzothiazole compounds of formula I functions at least as a rubber vulcanization accelerator. When such compounds are used in golf ball compositions, it has been discovered that golf ball compression and coefficient of restitution ("CoR," as defined below) are higher than in formulations that do not contain other typical vulcanization accelerators, such as zinc pentachlorothiophenol ("ZnPCTP") and others of which are described below in this disclosure. The increase in CoR is similar to what the effect that the addition of a crosslinking agent, such as zinc diacrylate, has on CoR. In addition, it has been discovered that when mercaptobenzothiazole compounds of formula I and/or mercaptobenzothiazole compounds of formula II are used in golf ball compositions in the presence of a cis-to-trans catalyst, e.g., ZnPCTP, golf ball coefficient of restitution surprisingly decreases without lowering compression.

The metallic mercaptothiazole compounds of formula I and metallic mercaptobenzothiazole compounds of formula I accelerate the vulcanization/crosslinking of rubber without causing any isomerism, e.g., cis to trans conversions, of the rubber constituents, unlike the sulfur-based compounds used in the past as cis-to-trans catalysts that convert cis-polybutadiene to trans-polybutadiene used in golf ball compositions in the past.

As used herein, the term "substituted or unsubstituted alkyl" means any substituted or unsubstituted acyclic carbon-containing groups. Examples of alkyl groups include lower alkyl groups, i.e., $C_1$–$C_6$ alkyl (e.g., methyl, ethyl, propyl, butyl, pentyl, hexyl, and isomers thereof, including, for example, iso-propyl, iso-propyl, n-butyl, iso-butyl, sec-butyl, tert-butyl, iso-pentyl, neo-pentyl, and the like); higher alkyl groups, i.e., alkyl groups containing seven or more carbon atoms (e.g., heptyl, octyl, nonyl, decyl, undecyl, dodecyl, and the like); alkenyl (e.g., ethenyl, propenyl, butenyl, pentenyl, hexenyl, heptenyl, octenyl, norbornenyl, nonenyl, decenyl, undecenyl, dodecenyl and the like); and alkynyl (e.g., ethynyl, propynyl, butynyl, pentynyl, hexynyl, heptynyl, octynyl, norbornynyl, nonynyl, decynyl, undecynyl, dodecynyl and the like). One of ordinary skill in the art is familiar with the various configurations of linear and branched alkyl groups, which are within the scope of the present invention.

As used herein, the term "substituted" means groups that also contain various substituents in which one or more hydrogen atoms is replaced by a functional group (e.g., a substituted alkyl group having one or more functional groups) or alkyl group as defined in the above. Functional groups include, but are not limited to, hydroxyl, amino (e.g., $R_1R_2N$, wherein $R_1$ and $R_2$ are each independently hydrogen, alkyl, aryl or cycloalkyl), alkoxy, carboxyl (e.g., ester, acid, and metal derivatives thereof), sulfoxidyl, sulfonyl, sulfonoyl, amido, phosphate, thiol, cyano, nitro, silyl and halogen (e.g., fluoro, chloro, bromo or iodo).

As used herein, "cycloalkyl" or "carbocyclic" means cyclic carbon-containing groups, including, but not limited to cyclic $C_3$–$C_{20}$ groups that may have one ring (e.g., cyclopropyl, cyclobutyl, cyclopentyl, cyclohexyl, cycloheptyl), or two or more rings fused at a single carbon atom (spiro rings, e.g., cyclopentanespirocyclobutane, cyclohexanespirocyclopentane) or fused at two or more carbon atoms (e.g., adamantyl, cis or trans decalin) and the like. Such cycloalkyl groups may also contain various substituents in which one or more hydrogen atoms has been replaced by a functional group. Such functional groups include those described above, and alkyl groups having from 1–28 carbon atoms. The cyclic groups of the invention may further include one or more heteroatoms, such as O, S, or N. In addition, such cycloalkyl groups may contain one or more double or triple bonds, e.g., cyclohexenyl or cyclohexynyl, and includes non-aromatic cycloalkyl groups having one or more double bonds, such as cyclopropadienyl, cyclopentadienyl, cycloheptadienyl and the like.

As used herein, "aryl" groups refers to any functional group including a hydrocarbon ring having a system of conjugated double bonds, typically comprising 4n+2pi (pi)

ring electrons, where n is an integer. Such aryl groups include substituted and unsubstituted $C_6$–$C_{24}$ annulenes, e.g., phenyl, anisyl, toluyl, anilinyl, acetophenonyl, halobenzyl (such as fluorobenzyl, chlorobenzyl, bromobenzyl, 1,2-, 1,3- and 1,4-halobenzyl), xylenyl and the like; polycyclic benzenoid aromatic hydrocarbons, e.g., naphthyl, anthracyl, phenanthranyl, pyrenyl and the like; and nonbenzenoid aromatic compounds, e.g., azulenyl. According to the present invention, aryl also includes heteroaryl or heterocyclic groups containing one or more heteroatoms, such as O, S, or N, e.g., pyrimidine or thiophene, pyridine, pyrrole, furan, and purine. These aryl groups may also be substituted with any number of a variety of functional groups.

In one embodiment, the metallic mercaptothiazole of formula I and/or the metallic mercaptobenzothiazole of formula II are present in the reaction product in an amount from about 0.01 pph to about 50 pph, preferably from about 0.1 pph to about 20 pph. As used herein, the term "parts per hundred", also known as "pph", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100. In another embodiment, the metallic mercaptothiazole of formula I and/or the metallic mercaptobenzothiazole of formula are present in the reaction product in an amount from about 1 pph to about 5 pph, preferably from about 2 pph to about 3 pph. The upper and lower limits of the ranges disclosed herein are interchangeable to form new ranges. For example, the amount of the metallic mercaptothiazole of formula I and/or the metallic mercaptobenzothiazole of formula II may be present from about 0.1 pph to about 5 pph, from about 1 pph to about 3 pph, and even 5 pph to about 20 pph.

The compositions of the present invention may be used with any type of ball construction. For example, the ball may have a one-piece, two-piece, or three-piece design, a multi-layer core, a multi-layer cover, one or more intermediate layers. As used herein, the term "multi-layer" means at least two layers. For example, the compositions of the invention may be used in a core, intermediate layer, and/or cover of a golf ball, each of which may have a single layer or multiple layers. Thus, the invention encompasses golf balls that includes at least one layer formed from a reaction product that includes at least one of a metallic mercaptothizoale of formula I or a metallic mercaptobenzothiazole of formula II. As used herein, the term "layer" includes any generally spherical portion of a golf ball, i.e., a golf ball core or center, an intermediate layer, and or a golf ball cover.

Thus, in one embodiment, a golf ball core includes a reaction product that includes at least one of a metallic mercaptothizaole of formula I or a metallic mercaptobenzothiazole of formula II. In another embodiment, a golf ball having more than one layer in the core includes in at least one of the core layers a reaction product that includes at least one of a metallic mercaptothizaole of formula I or a metallic mercaptobenzothiazole of formula II.

In another embodiment, a golf ball intermediate layer includes a reaction product that includes at least one of a metallic mercaptothizaole of formula I or a metallic mercaptobenzothiazole of formula II. In another embodiment, a golf ball having more than one intermediate layer includes in at least one of the intermediate layers a reaction product that includes at least one of a metallic mercaptothizaole of formula I or a metallic mercaptobenzothiazole of formula II.

In yet another embodiment, a golf ball cover includes a reaction product that includes at least one of a metallic mercaptothizaole of formula I or a metallic mercaptobenzothiazole of formula II. In another embodiment, a golf ball having more than one cover includes in at least one of the cover layers a reaction product that includes at least one of a metallic mercaptothizaole of formula I or a metallic mercaptobenzothiazole of formula II.

Figure 2:
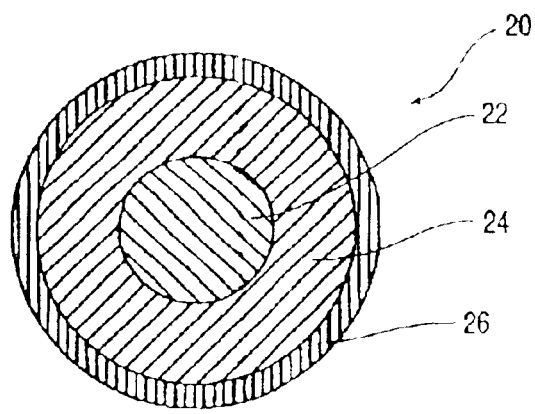
FIG. 2 is a cross-secion of a golf ball having an intermediate layer between a cover and a center according to the invention.
Figure 3:
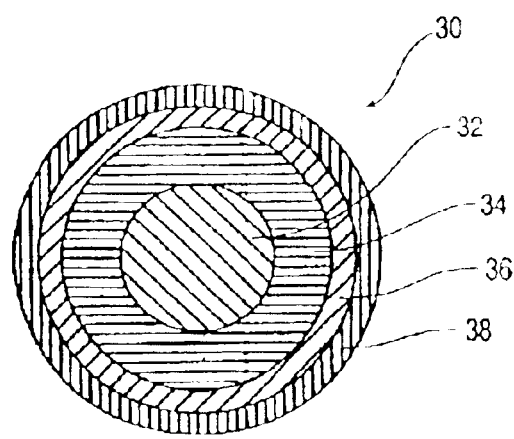
FIG. 3 is a cross section of a golf ball having more than one intermediate layer between a cover and a center according to the invention.

For example, FIG. 1 illustrates a golf ball according to the invention with a one-piece core. Golf ball 10 of the present invention can include a core 12 and a cover 16 surrounding the core 12, wherein at least one of core 12 and cover 16 incorporates at least one layer formed from a reaction product that includes at least one of a metallic mercaptothizaole of formula I or a metallic mercaptobenzothiazole of formula II. Similarly, FIG. 2 illustrates a multi-layer golf ball 20 that include a center 22, a cover 26, and at least one intermediate layer 24 disposed between the cover and the center. Each of the cover and center may also include more than one layer; i.e., the golf ball can be a conventional three-piece wound ball, a two-piece ball, a ball having a multi-layer core or an intermediate layer or layers, etc. Thus, referring to FIG. 3, a golf ball 30 of the present invention can include a center 32, a cover 38, and intermediate layers 34 and 36 disposed between the cover and the center. Although FIG. 3 shows only two intermediate layers, it will be appreciated that any number or type of intermediate layers may be used, as desired.

The resilient polymer component includes cis-polybutadiene, trans-polybutadiene, or mixtures thereof; cis-isoprene, trans-isoprene, or mixtures thereof; thermoplastic copolyester block copolymer; dynamically vulcanized thermoplastic elastomer; hydrogenated or non-hydrogenated styrene-butadiene elastomer; thermoplastic polyurethane; polymers made using a metallocene catalyst; ethylene propylenediene monomer; ethylene propylene rubber; or mixtures thereof. In one embodiment, the resilient polymer component is at least 90% cis-polybutadiene, more preferably from about 95% to about 99% cis-polybutadiene.

Core

The invention encompasses the use of a metallic mercaptothiazole- and/or metallic mercaptobenzothiazole-containing composition in a one-piece core or a multi-layer core. As used herein, the term "core" means the innermost portion of a golf ball, and may include one or more layers. When a multi-layer core is contemplated, the core is the innermost component with one or more additional core layers disposed thereon. At least a portion of the core, typically the center, is solid, semi-solid, hollow, powder-filled or fluid-filled. As used herein, the term "fluid" means a gas, liquid, gel, paste, or the like, or a combination thereof. Any core material known to one of ordinary skill in the art also is suitable for use in the golf balls of the present invention. Suitable core materials include thermoset materials, such as rubber, styrene butadiene, polybutadiene, isoprene, polyisoprene, trans-isoprene, as well as thermoplastics, such as ionomer resins, polyamides or polyesters, and thermoplastic and thermoset polyurethane and polyurea elastomers, and any mixture thereof.

In one embodiment, a core may also include conventional materials, such as compositions including a base rubber, a crosslinking agent, and a density adjusting filler. The base rubber may include natural or synthetic rubbers, as well as any combination thereof. In one embodiment, the base rubber is 1,4-polybutadiene having a cis-structure of at least about 40 percent, of which natural rubber, polyisoprene rubber and/or styrene-butadiene rubber may be thereto. In another embodiment, the base rubber is 1,4-polybutadiene having a cis-structure of at least about 85% percent, preferably 90% and more preferably 95%.

Crosslinking agents include metal salts of unsaturated fatty acids, such as zinc or magnesium salts of acrylic or methacrylic acid. The density adjusting filler typically includes materials such as zinc oxide, barium sulfate, silica, calcium carbonate, zinc carbonate and the like, as well as foaming agents.

Resilient Polymer Component

Preferably, the reaction product is used to form a portion of the center, at least one intermediate layer, the core or any combination thereof. More preferably, the reaction product is used to form the center of the golf ball. At least one intermediate layer is solid and includes a reinforcing polymer component as described herein to improve the centering of the layers within the ball.

The resilient polymer component includes, but is not limited to, polybutadiene, including cis-polybutadiene, trans-polybutadiene or mixtures thereof; isoprene, including cis-isoprene, trans-isoprene, or mixtures thereof; thermoplastic copolyesterester block copolymer; dynamically vulcanized thermoplastic elastomer; hydrogenated or non-hydrogenated styrene-butadiene elastomer with functional groups such as maleic anhydride or sulfonic acid attached; thermoplastic polyurethane or polymers made using a metallocene catalyst; or blends thereof. In one embodiment, the resilient polymer component comprises cis-polybutadiene, preferably greater than about 90% cis-polybutadiene, and more preferably from about 90% to about 99%.

In one embodiment, the resilient polymer component has a Mooney viscosity greater than about 20, preferably greater than about 30, and more preferably greater than about 40. Mooney viscosity is typically measured according to ASTM D-1646. In another embodiment, the Mooney viscosity of the polybutadiene is greater than about 35, and preferably greater than about 50. In one embodiment, the Mooney viscosity of the unvulcanized polybutadiene is from about 30 to about 120. In yet another embodiment, the Mooney viscosity is from about 40 to about 65, more preferably from about 45 to about 55.

In one embodiment, the center composition includes at least one rubber material having a resilience index of at least about 40. In another embodiment, the resilience index of the at least one rubber material is at least about 50.

Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, and BR1220, commercially available from Dow Chemicals of Midland, Mich. If desired, the polybutadiene can also be mixed with other elastomers known in the art such as natural rubber, polyisoprene rubber and/or styrene-butadiene rubber in order to modify the properties of the core.

Suitable thermoplastic copolyetheresters include HYTREL® 3078 and HYTREL® 4069, which are commercially available from E. I. DuPont de Nemours & Co. of Wilmington, Del. Suitable dynamically vulcanized thermoplastic elastomers include SANTOPRENE®, commercially available from Advanced Elastomer Systems of Akron, Ohio. Examples of suitable functionalized styrene-butadiene elastomers, include KRATON FG-1901x and FG-1921x, which are available from the Shell Corporation of Houston, Tex. Examples of suitable thermoplastic polyurethanes include ESTANE® 58133 and ESTANE® 58144, which are commercially available from the B. F. Goodrich Company of Cleveland, Ohio. Further, the materials for the intermediate layer described below may be in the form of a foamed polymeric material. For example, suitable metallocene polymers include foams of thermoplastic elastomers based on metallocene single-site catalyst-based foams. Suitable thermoplastic polyetheramides include PEBAX® 2533, PEBAX® 1205 and PEBAX® 4033 which are available from Elf-Atochem of King of Prussia, Pa. Suitable thermoplastic ionomer resins include any number of olefinic based ionomers including SURLYN® and IOTEK®, which are commercially available from E. I. DuPont de Nemours & Co. of Wilmington, Del., and Exxon Corporation of Irving, Tex., respectively. When the resilient polymer component includes any polymers in addition to polybutadiene, polybutadiene will be present in at least 50 pph of the resilient polymer component, preferably in an amount greater than about 75 pph, and more preferably in an amount greater than about 90 pph.

The resilient polymer component, free-radical initiator, filler(s), and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. One preferred mixing cycle, for example, is single step wherein the resilient polymer component, metallic mercaptothiazole or metallic mercaptobenzothiazole, filler, zinc diacrylate, and peroxide are added sequentially. Another preferred mixing cycle, for example, is a single step wherein the resilient polymer component, metallic mercaptothiazole or metallic mercaptobenzothiazole, cis-trans catalyst, filler, zinc diacrylate, and peroxide are added sequentially. In another preferred mixing cycle, for example, is single step wherein the resilient polymer component, metallic mercaptothiazole or metallic mercaptobenzothiazole, filler, zinc diacrylate, and peroxide are added sequentially. Another preferred mixing cycle, for example, is a single step wherein the resilient polymer component, metallic mercaptothiazole or metallic mercaptobenzothiazole, filler, zinc diacrylate, and peroxide are added sequentially. Suitable mixing equipment is well known to one of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, a mixing speed that is too high may undesirably result in creation of enough heat to initiate the crosslinking before the preforms are shaped and assembled around a core. The mixing temperature depends upon the type of polymer components, and more importantly, on the type of free-radical initiator. For example, when using di(2-tert-butyl-peroxyisopropyl) benzene as the free-radical initiator, a mixing temperature of about 80° C. to about 125° C., preferably about 88° C. to about 110° C., and more preferably about 90° C. to about 100° C., is suitable to safely mix the ingredients.

Additionally, it is important to maintain a mixing temperature below the peroxide decomposition temperature. For example, if dicumyl peroxide is selected as the peroxide, the temperature should not exceed 200° F. Suitable mixing speeds and temperatures are well-known to one of ordinary skill in the art, or may be readily determined without undue experimentation.

The mixture can be subjected to, for example, a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate crosslinking, and if a cis-to-trans catalyst is present, it may initiate crosslinking and the cis-to-trans conversion simultaneously. The temperature and duration of the molding cycle are selected based upon the type of peroxide and cis-to-trans catalyst selected. The molding cycle may have a single step of molding the mixture at a single temperature for a fixed time duration. An example of a single step molding cycle, for a mixture that contains dicumyl peroxide, would hold the polymer mixture at about 340° F. for a duration of about 15 minutes. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at about 290° F. for 40 minutes, then ramping the mold to about 340° F. where it is held for a duration of about 20 minutes. In a preferred embodiment of the current invention, a single-step cure cycle is employed. Single-step processes are effective and efficient, reducing the time and cost of a two-step process. For example, the resilient polymer component, metallic mercaptothiazole or metallic mercaptobenzothiazole, additional polymers, free-radical initiator, filler, any other materials used in forming either the golf ball center or any portion of the core, and optionally a cis-to-trans catalyst, in accordance with the invention, may be combined to form a golf ball by an injection molding process, which is also well-known to one of ordinary skill in the art. Although the curing time depends on the various materials selected, a particularly suitable curing time is about 5 to 18 minutes, preferably from about 8 to about 15 minutes, and more preferably from about 10 to about 12 minutes. One of ordinary skill in the art will be readily able to adjust the curing time based on the particular materials used at the particular temperatures, as discussion herein.

In one embodiment, the cured resilient polymer component is formed into an article having a first hardness at a point in the interior and a surface having a second hardness such that the second hardness differs from the first hardness by greater than 10 percent of the first hardness. The cured resilient polymer component can contain a greater amount of trans-polybutadiene than the uncured resilient polymer component. Preferably, the article is a sphere and the point is the midpoint of the article. In another embodiment, the second hardness differs from the first-by greater than 20 percent of the first hardness. The cured article also has a first amount of trans-polybutadiene at an interior location and a second amount of trans-polybutadiene at a surface location, wherein the first amount is at least about 6 percent less than the second amount, preferably at least about 10 percent less than the second amount, and more preferably at least about 20 percent less than the second amount. The interior location is preferably a midpoint and the article is preferably a sphere.

The compression of the core, or portion of the core, of golf balls prepared according to the invention is typically below 100, preferably below about 90, more preferably below about 80. In one embodiment, the compression of the core, or portion of the core, of golf balls is from about 25 to about 100. In another embodiment, the compression of the core, or portion of the core, of golf balls is from about 50 to about 95. In yet another embodiment, the compression of the core, or portion of the core, of golf balls is from about 75 to about 90.

The reaction product material preferably has a hardness of at least about 15 Shore A, more preferably between about 30 Shore A and 80 Shore D, and even more preferably between about 50 Shore A and 60 Shore D. In addition, the specific gravity is typically greater than about 0.7, preferably greater than about 1, for the golf ball polybutadiene material. Moreover, the reaction product preferably has a flexural modulus of from about 500 psi to about 300,000 psi, preferably from about 1,000 to about 250,000, and more preferably from about 2,000 to about 200,000 psi.

The desired loss tangent in the reaction product should be less than about 0.15 at −60° C. and less than about 0.05 at 30° C. when measured at a frequency of 1 Hz and a 1 percent strain. In one embodiment, the reaction product material preferably has a loss tangent below about 0.1 at −50° C., and more preferably below about 0.07 at −50° C.

To produce golf balls having a desirable compressive stiffness, the dynamic stiffness of the reaction product material should be less than about 50,000 N/m at −50° C. Preferably, the dynamic stiffness should be between about 10,000 and about 40,000 N/m at −50° C., more preferably, the dynamic stiffness should be between about 20,000 and about 30,000 N/m at −50° C.

In one embodiment, the reaction product has a first dynamic stiffness measured at −50° C. that is less than about 130 percent of a second dynamic stiffness measured at 0° C. In another embodiment, the first dynamic stiffness is less than about 125 percent of the second dynamic stiffness. In yet another embodiment, the first dynamic stiffness is less than about 110 percent of the second dynamic stiffness.

Although the reaction product discussed herein relates to core compositions, the invention also encompasses the use of such reaction product to form at least a portion of any component of a golf ball, including the cover(s) and intermediate layer(s).

Cis-to-Trans Catalyst

In one embodiment, the reaction product includes a cis-to-trans catalyst. Without being bound by any particular theory, it is believed that the cis-to-trans catalyst component, in conjunction with the free radical source, acts to convert a percentage of the polybutadiene polymer component from the cis- to the trans-conformation. Thus, the cis-to-trans conversion preferably includes the presence of a cis-to-trans catalyst. As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component (including metal-containing and nonmetal-containing organosulfur compounds), a Group VIA component, an inorganic sulfide, a substituted or unsubstituted aromatic organic compound that does not contain sulfur or metal, an aromatic organometallic compound, or any combination thereof. In one embodiment, the cis-to-trans catalyst is a blend of an organosulfur component and an inorganic sulfide component or a Group VIA component. In another embodiment, the cis-to-trans catalyst is a blend of an organosulfur component, an inorganic sulfide component, and a Group VIA component.

The invention also includes a method to convert the cis-isomer of polybutadiene to the trans-isomer during a molding cycle and to form a golf ball. Various combinations of polymers, cis-to-trans catalysts, fillers, crosslinkers, and a source of free radicals, may be used. Typically, a high-molecular weight polybutadiene with a cis-isomer content of typically greater than about 40% and preferably greater than about 70 percent is converted to increase the percentage of trans-isomer content at any point in the golf ball or portion thereof, preferably to increase the percentage throughout substantially all of the golf ball or portion thereof, during the molding cycle. More preferably, the cis-polybutadiene isomer is present in an amount of greater than about 80 percent of the total polybutadiene content. Most preferably, the cis-polybutadiene isomer is present in an amount of greater than about 96 percent of the total polybutadiene content. The use of a cis-to-trans catalyst in conjunction with the metallic mercaptothiazole and/or metallic mercaptobenzothiazole accelerators of the present invention allows for control and fine tuning of compression levels of the golf ball and its components.

Without wishing to be bound by any particular theory, it is believed that a low amount of 1,2-polybutadiene isomer ("vinyl-polybutadiene") is desired in the initial polybutadiene, and the reaction product. Typically, the vinyl polybutadiene isomer content is less than about 7 percent. Preferably, the vinyl polybutadiene isomer content is less than about 4 percent. More preferably, the vinyl polybutadiene isomer content is less than about 2 percent. Without wishing to be bound by any particular theory, it also is believed that the resulting mobility of the combined cis- and trans-polybutadiene backbone is responsible for the lower modulus and higher resilience of the reaction product and golf balls including the same.

To produce a polymer reaction product that exhibits the higher resilience and lower modulus (low compression) properties that are desirable and beneficial to golf ball playing characteristics, high-molecular-weight cis-1,4-polybutadiene, preferably may be converted to the trans-isomer during the molding cycle. The polybutadiene material typically has a molecular weight of greater than about 200,000. Preferably, the polybutadiene molecular weight is greater than about 250,000, more preferably between about 300,000 and 500,000. Without wishing to be bound by any particular theory, it is believed that the cis-to-trans catalyst component, in conjunction with the free radical source, acts to convert a percentage of the polybutadiene polymer component from the cis- to the trans-conformation.

As used herein when referring to the invention, the term "organosulfur compound(s)" or "organosulfur component(s)," refers to any compound containing carbon, hydrogen, and sulfur. As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur. Examples of organosulfur compound(s) or organosulfur component(s) include 4,4'-diphenyl disulfide; 4,4'-diphenyl acetylene, 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl) disulfide; 2,2'-bis(4-aminonaphthyl)disulfide; 2,2'-bis(5-aminonaphthyl)disulfide; 2,2'-bis(6-aminonaphthyl) disulfide; 2,2'-bis(7-aminonaphthyl)disulfide; 2,2'-bis(8-aminonaphthyl)disulfide; 1,1'-bis(2-aminonaphthyl) disulfide; 1,1'-bis(3-aminonaphthyl)disulfide; 1,1'-bis(3-aminonaphthyl)disulfide; 1,1'-bis(4-aminonaphthyl) disulfide; 1,1'-bis(5-aminonaphthyl)disulfide; 1,1'-bis(6-aminonaphthyl)disulfide; 1,1'-bis(7-aminonaphthyl) disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis (3,5-dichlorophenyl)disulfide; bis(2,4-dichlorophenyl) disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl) disulfide; bis(4-cyanophenyl)disulfide; bis(2-cyanophenyl) disulfide; bis(4-nitrophenyl)disulfide; bis(2-nitrophenyl) disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4carbamoylphenyl) disulfide; 1,1'-dinaphthyl disulfide; 2,2'-dinaphthyl disulfide; 1,2'-dinaphthyl disulfide; 2,2'-bis(1-chlorodinapthyl) disulfide; 2,2'-bis(1-bromonaphthyl)disulfide; 1,1'-bis(2-chloronaphthyl)disulfide; 2,2'-bis(1-cyanonaphtyl)disulfide; 2,2'-bis(1-acetylnaphthyl)disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. The organosulfur cis-to-trans catalyst, when present, is preferably present in an amount sufficient to produce the reaction product so as to contain at least about 12 percent trans-polybutadiene isomer, but typically is greater than about 32 percent trans-polybutadiene isomer based on the total resilient polymer component.

The organosulfur component may also be an halogenated organosulfur compound. Halogenated organosulfur compounds include, but are not limited to those having the following general formula III:

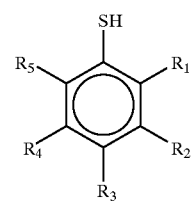

III where $R_1$–$R_5$ can be $C_1$–$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4- chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their salts with Zn, Cd, Sn, Mg, and Mn. Preferably, the halogenated organosulfur compound is pentachlorothiophenol ("PCTP"), which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif.

In one embodiment, the at least one organosulfur component is substantially free of metal. As used herein, "substantially free of metal" means less than about 10 weight percent metal, preferably less than about 5 weight percent, more preferably less than about 3 weight percent metal, even more preferably less than about 1 weight percent metal, and most preferably only trace amounts of metal, such as less than about 0.01 weight percent.

Suitable inorganic sulfide components include, but are not limited to titanium sulfide, manganese sulfide, and sulfide analogs of iron, calcium, cobalt, molybdenum, tungsten, copper, selenium, yttrium, zinc, tin, strontium, barium, vanadium, chromium, nickel, copper, zinc, cadmium, and bismuth.

Suitable metal-containing organosulfur components include, but are not limited to, cadmium, copper, lead, tellurium, zinc, tin, nickel, paladium, platinum, titanium, vanadium, chromium, and zirconium analogs of diethyldithiocarbamate, diamyldithiocarbamate, and dimethyldithiocarbamate, or mixtures thereof.

A substituted or unsubstituted aromatic organic compound may also be included in the cis-to-trans catalyst. In one embodiment, the aromatic organic compound is substantially free of metal. Suitable substituted or unsubstituted aromatic organic components include, but are not limited to, components having the formula $(R_1)_x$—$R_3$—M—$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group, acetylene group, or a metal component. $R_3$ and $R_4$ are each preferably from $C_6$ to $C_{20}$ aromatic group, and more preferably from a $C_6$ to $C_{16}$ aromatic group and most preferably a $C_6$ to $C_{10}$ aromatic group, including phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino (e.g., $R_1R_2N$, wherein $R_1$ and $R_2$ are each independently hydrogen, alkyl or cycloalkyl), nitro, cyano, and amido; alkoxy; carboxyl including esters, acids, and metal salts thereof; silyl; acrylates and metal salts thereof; sulfoxidyl, sulfonyl or sulfonamide; and phosphates and phosphites. When M is a metal component, it may be any suitable elemental metal available to one of ordinary skill in the art.

Typically, the metal will be a transition metal (e.g., titanium, vanadium, chromium, manganese, iron, cobalt, nickel, copper, zinc, molybdenum, tungsten, copper, selenium, yttrium, zinc, tin, and the like), a group IIIA, IVA or VA metal (e.g., gallium, tin, antimony, bismuth and the like); or a chalcogen (e.g., selenium, tellurium, or polonium). Preferably, the metal is tellurium or selenium.

In one embodiment, the optional aromatic component has the formula IV:

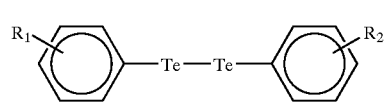

IV

In another embodiment, the optional aromatic component for use in the cis-to-trans catalyst is an azo compound having the formula V:

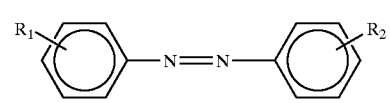

V

In formula IV, selenium may be used in place of the tellurium, if desired. In a most preferred embodiment, $R_3$ and $R_4$ are each a $C_6$ aryl group and M includes an azo group (e.g., azobenzene or a substituted azobenzene).

The cis-to-trans catalyst may also include a GroupVIA component. As used herein, the terms "Group VIA component" or "Group VIA element" mean a component that includes a sulfur component, selenium component, tellurium component, polonium component, or a combination thereof. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from R T Vanderbilt of Norwalk, Conn.

It is to be understood that when elemental sulfur or polymeric sulfur is included in the cis-to-trans catalyst, an accelerator may be used to improve the performance of the cis-to-trans catalyst and increase the trans-conversion for a given amount of sulfur catalyst. Suitable accelerators include, but are not limited to, sulfenamide, such as N-oxydiethylene 2-benzothiazole-sulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

The cis-to-trans catalyst is typically present in an amount sufficient to produce the reaction product so as to increase the trans-polybutadiene isomer content to contain from about 5 percent to 70 percent trans-isomer polybutadiene based on the total resilient polymer component. It is preferred that the cis-to-trans catalyst is present in an amount sufficient to increase the trans-polybutadiene isomer content at least about 15 percent, more preferably at least about 20 percent, and even more preferably at least about 25 percent. In another embodiment, the amount of trans-isomer content after conversion is about 30 percent or greater, and preferably about 35 percent or greater, and more preferably about 40 percent or greater. In yet another embodiment, the amount of trans-isomer after conversion may be about 45 percent or greater.

The cured portion of the component including the reaction product of the invention may have a first amount of trans-isomer polybutadiene at an interior location and a second amount of trans-isomer polybutadiene at an exterior surface location. In one embodiment, the amount of trans-isomer at the exterior surface location is greater than the amount of trans-isomer at an interior location. As will be further illustrated by the examples provided herein, the difference in trans-isomer content between the exterior surface and the interior location after conversion may differ depending on the cure cycle and the ratios of materials used for the conversion reaction. For example, it is also possible that these differences can reflect a center with greater amounts of trans-isomer at the interior portion than at the exterior portion.

The exterior portion of the center may have amounts of trans-isomer after conversion in the amounts already indicated previously herein, such as in amounts about 10 percent or greater, about 15 percent or greater, and the like, up to and including amounts that are about 45 percent or greater as stated above. For example, in one embodiment of the invention, the reaction product may contain between about 35 percent to 60 percent of the trans-isomer at the exterior surface of a center portion. Another embodiment has from about 40 percent to 50 percent of trans-isomer at the exterior surface of a center portion. In one embodiment, the reaction product contains about 45 percent trans-isomer polybutadiene at the exterior surface of a center portion. In one embodiment, the reaction product at the center of the solid center portion may then contain at least about 20 percent less trans-isomer than is present at the exterior surface, preferably at least about 30 percent less trans-isomer, or at least about 40 percent less trans-isomer. In another embodiment, the amount of trans-isomer at the interior location is at least about 6 percent less than is present at the exterior surface, preferably at least about 10 percent less than the second amount.

The gradient between the interior portion of the center and the exterior portion of the center may vary. In one embodiment, the difference in trans-isomer content between the exterior and the interior after conversion is about 3 percent or greater, while in another embodiment the difference may be about 5 percent or greater. In another embodiment, the difference between the exterior surface and the interior location after conversion is about 10 percent or greater, and more preferably is about 20 percent or greater. In yet another embodiment, the difference in trans-isomer content between the exterior surface and the interior location after conversion may be about 5 percent or less, preferably about 3 percent or less, and more preferably less than about 1 percent.

The cis-to-trans catalyst is preferably present in an amount from about 0.1 pph to 25 pph of the total resilient polymer component. In one embodiment, the cis-to-trans catalyst is present in an amount from about 0.1 pph to 12 pph of the total resilient polymer component. In another embodiment, the cis-to-trans catalyst is present in an amount from about 0.1 pph to 8 pph of the total resilient polymer component. The lower end of the above-mentioned ranges may be increased if it is determined that 0.1 pph does not provide the desired amount of conversion. For instance, the amount of the cis-to-trans catalyst may be about 0.5 pph or more, 0.75 pph or more, 1.0 pph or more, or even 1.5 pph or more.

In one embodiment, the cis-to-trans catalyst includes an organosulfur component that is present in the reaction product in an amount from about 0.5 pph or greater. In another embodiment, the cis-to-trans catalyst includes an organosulfur component that is present in the reaction product in an amount from about 0.7 pph or greater. In yet another embodiment, the cis-to-trans catalyst includes an organosulfur component that is present in the reaction product in an amount from about 1.0 pph or greater. In still another embodiment, the cis-to-trans catalyst includes an organosulfur component that is present in the reaction product in an amount from about 2.0 pph or greater.

In one embodiment, the cis-to-trans catalyst includes a metal-containing organosulfur component in the reaction product in an amount from about 1.0 pph or greater. In another embodiment, the cis-to-trans catalyst includes a metal-containing organosulfur component in the reaction product in an amount from about 1.5 pph or greater and in yet another embodiment, the cis-to-trans catalyst includes a metal-containing organosulfur component in the reaction product in an amount from about 2.0 pph or greater.

In one embodiment, the cis-to-trans catalyst includes a Group VIA component in the reaction product in an amount from about 0.25 pph or greater. In another embodiment, the cis-to-trans catalyst includes a Group VIA component in the reaction product in an amount from about 0.5 pph or greater and in yet another embodiment, the cis-to-trans catalyst includes a Group VIA component in the reaction product in an amount from about 1.0 pph or greater.

In one embodiment, the cis-to-trans catalyst includes an inorganic sulfide component in the reaction product in an amount from about 0.5 pph or greater. In another embodiment, the cis-to-trans catalyst includes an inorganic component component in the reaction product in an amount from about 0.75 pph or greater and in yet another embodiment, the cis-to-trans catalyst includes an inorganic sulfide component in the reaction product in an amount from about 1.0 pph or greater.

The measurement of trans-isomer content of polybutadiene referred to herein may be accomplished as follows. Calibration standards are prepared using at least two polybutadiene rubber samples of known trans-isomer content, e.g., high and low percent trans-polybutadiene. These samples are used alone and blended together in such a way as to create a ladder of trans-polybutadiene content of at least about 1.5% to 50% or to bracket the unknown amount, such that the resulting calibration curve contains at least about 13 equally spaced points.

Using a commercially available Fourier Transform-Infrared (FT-IR) spectrometer equipped with a Photoacoustic (PAS) cell, a PAS spectrum of each standard was obtained using the following instrument parameters: scan at speed of 2.5 KHz (0.16 cm/sec optical velocity), use a 1.2 KHz electronic filter, set an undersampling ratio of 2 (number of laser signal zero crossings before collecting a sample), co-add a minimum of 128 scans at a resolution of 4 $cm^{-1}$ over a range of 375 $cm^{-1}$ to 4000 $cm^{-1}$ with a sensitivity setting of 1.

The cis-, trans-, and vinyl-polybutadiene peaks found between 600 cm$^{-1}$ and 1100 cm$^{-1}$ from the PAS spectra can be integrated. The area under the trans-polybutadiene peaks as a fraction of the total area under the three isomer peaks can then be determined to construct a calibration curve of the trans-polybutadiene area fraction versus the actual trans-polybutadiene content. The correlation coefficient ($R^2$) of the resulting calibration curve must be a minimum of 0.95.

A PAS spectrum is obtained using the parameters described above for the unknown core material at the point of interest (e.g., the surface or center of the core) by filling the PAS cell with a sample containing a freshly cut, uncontaminated surface free of foreign matters such as mold release and the like. The trans-polybutadiene area fraction of the unknown is analyzed to determine the actual trans-isomer content from the calibration curve. An increase in the trans-isomer content anywhere in the article being manufactured or tested should be understood herein to refer to the trans- at any point in the article.

In one known circumstance when barium sulfate is included, an additional or alternative test of the trans-isomer content of polybutadiene is utilized to ensure accurate measurement of trans-polybutadiene. Calibration standards are prepared using at least two polybutadienes of known trans-content (e.g., high and low percent trans-polybutadiene). These samples are used alone and blended together in a way that forms a ladder of trans-polybutadiene content of at least about 1.5% to about 50% or to bracket the unknown amount, such that the resulting calibration curve contains at least about 13 equally spaced points.

Using a Fourier Transform-Raman (FT-Raman) spectrometer equipped with a near-infrared laser, a Stokes Raman spectrum should be obtained from each standard using the following instrument parameters: sufficient laser power to obtain a good signal to noise ratio without causing excessive heating or fluorescence (typically about 400 mW to 800 mW is suitable); a resolution of 2 cm$^{-1}$; over a Raman shift spectral range of about 400 cm$^{-1}$ to 4000 cm$^{-1}$; and co-adding at least 300 scans.

A calibration curve may be constructed from the data generated above, using a chemometrics approach and software, such as PLSplus/IQ from Galactic Industries Corp. of Salem, N.H. An acceptable calibration is obtained with this software using a PLS-1 curve generated using an SNV (detrend) pathlength correction, a mean center data preparation, and a 5-point SG second derivative over the spectral range from about 1600 cm$^{-1}$ to 1700 cm$^{-1}$. The correlation coefficient ($R^2$) of the resulting calibration curve must be a minimum of 0.95.

A Raman spectrum of the unknown core material is obtained using this instrument at the point of interest in the unknown sample (e.g., surface or center of the golf ball core). The unknown must be free of foreign matter, such as mold release, etc., that may cause inaccurate readings. The spectrum of the unknown may be analyzed using the PLS calibration curve to determine trans-polybutadiene isomer content of the unknown sample.

Free Radical Source

A free-radical source, often alternatively referred to as a free-radical initiator, is preferred in the composition and method. The free-radical source is typically a peroxide, and preferably an organic peroxide, which decomposes during the cure cycle. Suitable free-radical sources include organic peroxide compounds, such as di-tert-amyl peroxide, di(2-tert-butyl-peroxyisopropyl)benzene peroxide or α,α-bis (tert-butylperoxy) diisopropylbenzene, 1,1-bis(tert-butylperoxy)-3,3,5-trimethylcyclohexane or 1,1-di(tert-butylperoxy) 3,3,5-trimethyl cyclohexane, dicumyl peroxide, di-tert-butyl peroxide, 2,5-di-(tert-butylperoxy)-2,5-dimethyl hexane, n-butyl-4,4-bis(tert-butylperoxy) valerate, lauryl peroxide, benzoyl peroxide, tert-butyl hydroperoxide, and the like, and any mixture thereof.

Other examples include, but are not limited to, VAROX® 231XL and Varoxo® DCP-R, commercially available from Atofina Chemicals, Inc. of King of Prussia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98 percent active and has an active oxygen content of 5.8 percent, whereas PERKODOX® DCP-70 is 70 percent active and has an active oxygen content of 4.18 percent.

The peroxide may be present in an amount greater than about 0.1 pph of the total resilient polymer component, preferably about 0.1 pph to about 15 pph of the resilient polymer component, and more preferably about 0.2 pph to about 5 pph of the total resilient polymer component. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent 4 pph of a concentrate peroxide that is 50 percent active (i.e., 2 divided by 0.5=4).

In one embodiment, the amount of free radical source is about 5 pph or less, but also may be about 3 pph or less. In another embodiment, the amount of free radical source is about 2.5 pph or less. In yet another embodiment, the amount of free radical source is about 2 pph or less. In still another embodiment, the amount of free radical source is about 1 pph or less preferably about 0.75 pph or less.

It should be understood by one of ordinary skill in the art that the presence of certain metallic mercaptothiazoles, metallic mercaptobenzothiazoles or cis-to-trans catalysts according to the invention be more suited for a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. The skilled artisan is aware that heat often facilitates initiation of the generation of free radicals.

In one embodiment, the ratio of the free radical source to the metallic mercaptothiazole, metallic mercaptobenzothiazole or cis-to-trans catalyst may be about 10 or less, or about 5 or less. In another embodiment, the ratio of the free radical source to the metallic mercaptothiazole, metallic mercaptobenzothiazole or cis-to-trans catalyst may be about 1 or less, or about 0.5 or less.

Cis-to-Trans Catalyst Accelerator(s)

It is to be understood that when elemental sulfur or polymeric sulfur is included in the cis-to-trans catalyst, an accelerator may be used to improve the performance of the cis-to-trans catalyst. Suitable accelerators include, but are not limited to, sulfenamide, such as N-oxydiethylene 2-benzothiazole-sulfenamide; thiazole, such as benzothiazyl disulfide; dithiocarbamate, such as bismuth dimethyldithiocarbamate; thiuram, such as tetrabenzyl thiuram disulfide; xanthate, such as zinc isopropyl xanthate; thiadiazine; thiourea, such as trimethylthiourea; guanadine, such as N,N'-di-ortho-tolylguanadine; or aldehyde-amine, such as a butyraldehyde-aniline condensation product; or mixtures thereof.

Accelerators are typically present in an amount from about 0.1 pph to about 30 pph of the cis-to-trans catalyst, preferably from about 1 pph to about 15 pph of the cis-to-trans catalyst, more preferably from about 2 pph to about to about 5 pph. In another embodiment, the amount of cis-to-trans catalyst is from about 2.3 pph to about 3 pph. However, one of ordinary skill in the art readily would be able to adjust the amount of accelerator as to optimize the performance of the cis-to-trans catalyst. As mentioned above, the upper and lower limits disclosed herein may be interchanged to form new ranges. For example, the amount of cis-to-trans catalyst may also be from 0.1 pph to about 2.3 pph, from about 3 pph to about 15 pph, and from about 1 pph to about 5 pph.

Crosslinking Agent(s)

Crosslinkers (i.e., crosslinking agents) may be included to increase the hardness of the reaction product. Suitable crosslinking agents include one or more metallic salts of unsaturated acid monomers or unsaturated fatty acids having 3 to 8 carbon atoms, such as acrylic or methacrylic acid, or monocarboxylic acids, including zinc, calcium, or magnesium acrylate salts, and the like, and mixtures thereof. Exemplary crosslinkers include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. In one embodiment, zinc methacrylate is used in combination with the zinc salt of pentachlorothiophenol. Crosslinkers also include organic acids having more than one carboxylic acid groups, including diacids, triacids and tetracids.

The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to one of ordinary skill in the art. It is known that the use of crosslinkers increase the compression of golf balls. However, the use of one or more metallic mercaptothiazole compounds of formula I and/or metallic mercaptobenzothiazole compounds of formula II enables the golf balls to be manufactured using less crosslinkers while achieving at least the same compression.

The crosslinking agent is typically present in an amount greater than about 0.1 percent of the polymer component, preferably from about 10 to 50 percent of the resilient polymer component, more preferably from about 20 to 40 percent of the resilient polymer component.

In one embodiment, the crosslinking agent is present in an amount greater than about 10 pph of the base polymer, preferably from about 20 pph to about 40 pph of the base polymer, more preferably from about 25 pph to about 35 pph of the base polymer.

When an organosulfur is selected as the cis-to-trans catalyst, zinc diacrylate may be selected as the crosslinking agent and is present in an amount of less than about 25 pph.

The crosslinking agents can be in pure form, i.e., in 100% active form, or dispersed in a suitable carrier known to one of ordinary skill in the art.

Fillers

Fillers added to one or more portions of the golf ball typically include processing aids or compounds to affect rheological and mixing properties, the specific gravity (i.e., density-modifying fillers), the modulus, the tear strength, reinforcement, and the like. The fillers are generally inorganic, and suitable fillers include numerous metals (including metal powders) or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Foamed polymer blends may be formed by blending ceramic or glass microspheres with polymer material. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Antioxidant

Typically, antioxidants are included in conventional golf ball core compositions because antioxidants are included in the materials supplied by manufacturers of compounds used in golf ball cores. Without being bound to any particular theory, higher amounts of antioxidant in the reaction product may result in less trans-isomer content because the antioxidants consume at least a portion of the free radical source. Even with high amounts of the free radical source in the reaction product described above (e.g., about 3 pph), an amount of antioxidant greater than about 0.3 pph may significantly reduce the effective amount of free radicals that are actually available to adequately assist in a cis-to-trans conversion. Accordingly, one way to ensure sufficient amounts of free radicals are provided for the conversion is to increase the initial levels of free radicals present in the composition so that sufficient amounts of free radicals remain after interaction with antioxidants in the composition. Thus, the initial amount of free radicals provided in the composition may be increased by at least about 10 percent, and more preferably by at least about 25 percent so that the effective amount of remaining free radicals sufficient to adequately provide the desired cis-to-trans conversion. Depending on the amount of antioxidant present in the composition, the initial amount of free radicals may be increased by at least 50 percent, 100 percent, or an even greater amount as needed. As discussed below, selection of the amount of free radicals in the composition may be determined based on a desired ratio of free radicals to antioxidant.

Another approach to ensure sufficient amounts of free radicals is to reduce the levels of or eliminate antioxidants in the composition. For example, the reaction product of the present invention may be substantially free of antioxidants, thereby achieving greater utilization of the free radicals toward the cis-to-trans conversion. As used herein, the term "substantially free" generally means that the reaction product includes less than about 0.3 pph of antioxidant, preferably less than about 0.1 pph of antioxidant, more preferably less than about 0.05 pph of antioxidant, and most preferably about 0.01 pph or less antioxidant.

The amount of antioxidant has been shown herein to have a relationship with the amount of trans-isomer content after conversion. For example, a reaction product with 0.5 pph of antioxidant cured at 335° F. for 11 minutes results in about 15 percent trans-isomer content at an exterior surface of the center and about 13.4 percent at an interior location after the conversion reaction. In contrast, the same reaction product substantially free of antioxidants results in about 32 percent trans-isomer content at an exterior surface and about 21.4 percent at an interior location after the conversion reaction.

In one embodiment, the ratio of the free radical source to antioxidant is greater than about 10. In another embodiment, the ratio of the free radical source to antioxidant is greater than 50, and more preferably about 100 or greater. In yet another embodiment, the free radical source-antioxidant ratio is about 500 or greater, preferably about 1000 or greater, and more preferably 5000 or greater.

If the reaction product is substantially free of antioxidants, the amount of the free radical source is preferably about 3 pph or less. In one embodiment, the free radical source is present in an amount of about 2.5 pph or less, preferably about 1.5 pph or less, more preferably about 1 pph or less and most preferably about 0.75 pph or less.

When the reaction product contains about 0.1 pph or greater antioxidant, the free radical source is preferably present in an amount of about 1 pph or greater. In one embodiment, when the reaction product has about 0.1 pph or greater antioxidant, the free radical source is present in an amount of about 2 pph or greater. In another embodiment, the free radical source is present in an amount of about 2.5 pph or greater when the antioxidant is present in an amount of about 0.1 pph or greater.

In one embodiment, when the reaction product contains greater than about 0.05 pph of antioxidant, the free radical source is preferably present in an amount of about 0.5 pph or greater. In another embodiment, when the reaction product has greater than about 0.05 pph of antioxidant, the free radical source is present in an amount of about 2 pph or greater. In yet another embodiment, the free radical source is present in an amount of about 2.5 pph or greater when the antioxidant is present in an amount of about 0.05 pph or greater.

Other Additives

Additional materials conventionally included in golf ball compositions may be added to the reaction product of the invention. These additional materials include, but are not limited to, density-adjusting fillers, coloring agents, reaction enhancers, whitening agents, UV absorbers, hindered amine light stabilizers, defoaming agents, processing aids, and other conventional additives. Stabilizers, softening agents, plasticizers, including internal and external plasticizers, impact modifiers, foaming agents, excipients, reinforcing materials and compatibilizers can also be added to any composition of the invention. All of these materials, which are well known in the art, are added for their usual purpose in typical amounts.

For example, the fillers discussed above with respect to the reaction product of the invention may be added to the reaction product to affect rheological and mixing properties, the specific gravity (i.e., density-modifying fillers), the modulus, the tear strength, reinforcement, and the like. Fillers may also be used to modify the weight of the core, e.g., a lower weight ball is preferred for a player having a low swing speed.

Intermediate Layer

An "intermediate layer" (also known as inner layer or mantle layer) is defined herein as a portion of the golf ball that occupies a volume between the cover and the core. Such an intermediate layer may be distinguished from a cover or a core by some difference between the golf ball layers, e.g., hardness, compression, thickness, and the like. An intermediate layer may be used, if desired, with a multilayer cover or a multilayer core, or with both a multilayer cover and a multilayer core. Accordingly, an intermediate layer is also sometimes referred to in the art as an inner cover layer, as an outer core layer or as a mantle layer, i.e., any layer(s) disposed between the inner core and the outer cover of a golf ball, this layer may be incorporated, for example, with a single layer or a multilayer cover, with a one-piece core or a multilayer core, with both a single layer cover and core, or with both a multilayer cover and a multilayer core. As with the core, the intermediate layer may also include a plurality of layers. It will be appreciated that any number or type of intermediate layers may be used, as desired.

When the golf ball of the present invention includes an intermediate layer, such as an inner cover layer or outer core layer, i.e., any layer(s) disposed between the inner core and the outer cover of a golf ball, the intermediate layer can include at least one layer having about 1 percent to about 100 percent of the compositions of the invention. In particular, the intermediate layer may be formed from the reaction product that includes a resilient polymer component; a free radical source; at least one of a metallic mercaptothiazole of formula I or a metallic mercaptobenzothiazole of formula II; and optionally one or more of a cis-to-trans catalyst, crosslinking agent, or a filler, as described hereinabove.

In another embodiment, the intermediate layer can include any materials known to one of ordinary skill in the art including thermoplastic and thermosetting materials.

The intermediate layer may also likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly (caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of King of Prussia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In another embodiment, the intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof.

An intermediate layer may include ionomeric materials, such as ionic copolymers of ethylene and an unsaturated monocarboxylic acid, which are available under the trademark SURLYN® of E. I. DuPont de Nemours & Co., of Wilmington, Del., or IOTEK® or ESCOR® of Exxon. These are copolymers or terpolymers of ethylene and methacrylic acid or acrylic acid totally or partially neutralized, i.e., from about 1 to about 100 percent, with salts of zinc, sodium, lithium, magnesium, potassium, calcium, manganese, nickel or the like. In one embodiment, the carboxylic acid groups are neutralized from about 10 percent to about 100 percent. The carboxylic acid groups may also include methacrylic, crotonic, maleic, fumaric or itaconic acid. The salts are the reaction product of an olefin having from 2 to 10 carbon atoms and an unsaturated monocarboxylic acid having 3 to 8 carbon atoms. Other ionomers that may be used are disclosed in U.S. Pat. No. 6,162,135, the entirety of which is incorporated herein by reference.

The intermediate layer may also include at least one ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. In another embodiment, the acrylic or methacrylic acid is present in about 8 to 35 weight percent, more preferably 8 to 25 weight percent, and most preferably 8 to 20 weight percent.

The ionomer also may include so-called "low acid" and "high acid" ionomers, as well as blends thereof. In general, ionic copolymers including up to about 15 percent acid are considered "low acid" ionomers, while those including greater than about 15 percent acid are considered "high acid" ionomers.

A low acid ionomer is believed to impart high spin. Thus, in one embodiment, the intermediate layer includes a low acid ionomer where the acid is present in about 10 to 15 weight percent and optionally includes a softening comonomer, e.g., iso- or n-butylacrylate, to produce a softer terpolymer. The softening comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

In another embodiment, the intermediate layer includes at least one high acid ionomer, for low spin rate and maximum distance. In this aspect, the acrylic or methacrylic acid is present in about 15 to about 35 weight percent, making the ionomer a high modulus ionomer. In one embodiment, the high modulus ionomer includes about 16 percent by weight of a carboxylic acid, preferably from about 17 percent to about 25 percent by weight of a carboxylic acid, more preferably from about 18.5 percent to about 21.5 percent by weight of a carboxylic acid. In some circumstances, an additional comonomer such as an acrylate ester (i.e., iso- or n-butylacrylate, etc.) can also be included to produce a softer terpolymer. The additional comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high modulus ionomers include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

In one embodiment, the intermediate layer may be formed from at least one polymer containing $\alpha,\beta$-unsaturated carboxylic acid groups, or the salts thereof, that have been 100 percent neutralized by organic fatty acids. The organic acids are aliphatic, mono-functional (saturated, unsaturated, or multi-unsaturated) organic acids. Salts of these organic acids may also be used, including salts of barium, lithium, sodium, zinc, bismuth, chromium, cobalt, copper, potassium, strontium, titanium, tungsten, magnesium, cesium, iron, nickel, silver, aluminum, tin, or calcium; as well as salts of fatty acids, particularly stearic, bebenic, erucic, oleic, or linoelic acids or dimerized derivatives thereof. It is preferred that the organic acids and salts of the present invention be relatively non-migratory (i.e., they do not bloom to the surface of the polymer under ambient temperatures) and non-volatile (they do not volatilize at temperatures required for melt-blending).

The acid moieties of the highly-neutralized polymers ("HNP"), typically ethylene-based ionomers, are preferably neutralized greater than about 70 percent, more preferably greater than about 90 percent, and most preferably at least about 100 percent. The HNP's may be also be blended with a second polymer component, which, if containing an acid group, may be neutralized in a conventional manner, by organic fatty acids, or both. The second polymer component, which may be partially or fully neutralized, preferably includes ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

Thermoplastic polymer components, such as copolyetheresters (e.g., HYTREL®, available from DuPont), copolyesteresters, copolyetheramides (e.g., PEBAX®, available from Atofina Chemicals, Inc.) elastomeric polyolefins, styrene diene block copolymers and their hydrogenated derivatives (e.g. block copolymers of styrene-butadiene-styrene, styrene-(ethylene-propylene)-styren or styrene-(ethylene-butylene)-styrene, as well as KRATON D®, KRATON G®, KRATON FG® from Shell Chemical), copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

Examples of these materials are disclosed in U.S. Patent Application Publication Nos. 2001/0018375 and 2001/0019971, which are incorporated herein by reference in their entirety.

The ionomer compositions may also include at least one grafted metallocene catalyzed polymer. Blends of this embodiment may include about 1 pph to about 100 pph of at least one grafted metallocene catalyzed polymer and about 99 pph to 0 pph of at least one ionomer, preferably from about 5 pph to about 90 pph of at least one grafted metallocene catalyzed polymer and about 95 pph to about 10 pph of at least one ionomer, more preferably from about 10 pph to about 75 pph of at least one grafted metallocene catalyzed polymer and about 90 pph to about 25 pph of at least one ionomer, and most preferably from about 10 pph to about 50 pph of at least one grafted metallocene catalyzed polymer and about 90 pph to about 50 pph of at least one ionomer. Where the layer is foamed, the grafted metallocene catalyzed polymer blends may be foamed during molding by any conventional foaming or blowing agent. In addition, polyamides may also be blended with ionomers.

Non-Ionomeric Thermoplastic Materials

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/nonionomer blends are disclosed in co-pending U.S. patent application Ser. No. 10/138,304, filed May 6, 2002, entitled "Golf Ball Incorporating Grafted Metallocene Catalyzed Polymer Blends," the entire disclosure of which is incorporated by reference herein.

In one embodiment, polyamide homopolymers, such as polyamide 6,18 and polyamide 6,36 are used alone, or in combination with other polyamide homopolymers. In another embodiment, polyamide copolymers, such as polyamide 6,10/6,36, are used alone, or in combination with other polyamide homopolymers or copolymers. Other examples of suitable polyamide homopolymers and copolymers include polyamide polyamide 4, polyamide 6, polyamide 7, polyamide 11, polyamide 12 (manufactured as Rilsan AMNO by Atofina Chemicals, Inc. of King of Prussia, Pa.), polyamide 13, polyamide 4,6, polyamide 6,6, polyamide 6,9, polyamide 6,10, polyamide 6,12, polyamide 6,36, polyamide 12,12, polyamide 13,13, polyamide 6/6,6, polyamide 6,6/6,10, polyamide 6/6,T wherein T represents terephthalic acid, polyamide 6/6,6/6,10, polyamide 6,10/6,36, polyamide 66,6,18, polyamide 66,6,36, polyamide 6/6,18, polyamide 6/6,36, polyamide 6/6,10/6,18, polyamide 6/6, 10/6,36, polyamide 6,10/6,18, polyamide 6,12/6,18, polyamide 6,12/6,36, polyamide 6/66/6,18, polyamide 6/66/6,36, polyamide 66/6,10/6,18, polyamide 66/6,10/6,36, polyamide 6/6,12/6,18, polyamide 6/6,12/6,36, and mixtures thereof.

As mentioned above, any of the above polyamide homopolymer, copolymer, and homopolymer/copolymer blends may be optionally blended with nonionomer polymers, such as nonionomer thermoplastic polymers, nonionomer thermoplastic copolymers, nonionomer TPEs, or mixtures thereof.

One specific example of a polyamide-nonionomer blend is a polyamide-metallocene catalyzed polymer blend. The blended compositions may include grafted and/or non-grafted metallocene catalyzed polymers. Grafted metallocene catalyzed polymers, functionalized with pendant groups, such as maleic anhydride, and the like, are available in experimental quantities from DuPont. Grafted metallocene catalyzed polymers may also be obtained by subjecting a commercially available non-grafted metallocene catalyzed polymer to a post-polymerization reaction involving a monomer and an organic peroxide to provide a grafted metallocene catalyzed polymer with the desired pendant group or groups.

Another example of a polyamide-nonionomer blend is a polyamide and non-ionic polymers produced using non-metallocene single-site catalysts. As used herein, the term "non-metallocene catalyst" or non-metallocene single-site catalyst" refers to a single-site catalyst other than a metallocene catalyst. Examples of suitable single-site catalyzed polymers are disclosed in U.S. Pat. No. 6,476,130, of which the entire disclosure is incorporated by reference herein.

Nonionomers suitable for blending with the polyamide include, but are not limited to, block copoly(ester) copolymers, block copoly(amide) copolymers, block copoly (urethane) copolymers, styrene-based block copolymers, thermoplastic and elastomer blends wherein the elastomer is not vulcanized (TEB), and thermoplastic and elastomer or rubber blends wherein the elastomer is dynamically vulcanized (TED). Other nonionomers suitable for blending with polyamide to form an intermediate layer composition include, but are not limited to, polycarbonate, polyphenylene oxide, imidized, amino group containing polymers, high impact polystyrene (HIPS), polyether ketone, polysulfone, poly(phenylene sulfide), reinforced engineering plastics, acrylic-styrene-acrylonitrile, poly (tetrafluoroethylene), poly(butyl acrylate), poly(4-cyanobutyl acrylate), poly(2-ethylbutyl acrylate), poly (heptyl acrylate), poly(2-methylbutyl acrylate), poly(3-methylbutyl acrylate), poly(N-octadecylacrylamide), poly (octadecyl methacrylate), poly(4-dodecylstyrene), poly(4-tetradecylstyrene), poly(ethylene oxide), poly (oxymethylene), poly(silazane), poly(furan tetracarboxylic acid diimide), poly(acrylonitrile), poly(methylstyrene), as well as the classes of polymers to which they belong and their copolymers, including functional comonomers, and blends thereof.

In one embodiment, the non-ionomeric materials have a hardness of about 50 Shore D or greater, and a flexural modulus of about 30,000 psi or greater. In another embodiment, the non-ionomeric materials have a hardness of about 60 Shore D or greater, and a flexural modulus of about 50,000 psi or greater. In yet another embodiment, the non-ionomeric materials have a hardness of about 65 Shore D or greater, and a flexural modulus of about 60,000 psi or greater.

Resilient Polymer—Reinforcing Polymer Blend

The intermediate layer may include a resilient polymer component, which is preferably used as the majority polymer in the intermediate layer to impart resilience in the cured state, and a reinforcing polymer component as a blend.

Resilient polymers suitable for use in the intermediate layer include polybutadiene, polyisoprene, styrene-butadiene, styrene-propylene-diene rubber, ethylene-propylene-diene (EPDM), mixtures thereof, and the like, preferably having a high molecular weight of at least about 50,000 to about 1,000,000. In another embodiment, the molecular weight is from about 250,000 to about 750,000, and more preferably from about 200,000 to about 400,000.

The reinforcing polymer component preferably has a glass transition temperature (TG) sufficiently low to permit mixing without initiating crosslinking, preferably between about 35° C. to 120° C. In addition, the reinforcing polymer component preferably has a sufficiently low viscosity at the mixing temperature when mixed with the resilient polymer component to permit proper mixing of the two polymer components. The weight of the reinforcing polymer relative to the total composition for forming the intermediate layer generally ranges from about 5 to 25 weight percent, preferably about 10 to 20 weight percent.

Examples of polymers suitable for use in the reinforcing polymer component include: trans-polyisoprene, block copolymer ether/ester, acrylic polyol, polyethylene, polyethylene copolymer, 1,2-polybutadiene (syndiotactic), ethylene-vinyl acetate copolymer, trans-polycyclooctenenamer, trans-isomer polybutadiene, and mixtures thereof. Particularly suitable reinforcing polymers include: HYTREL 3078, a block copolymer ether/ester commercially available from DuPont of Wilmington, Del.; a trans-isomer polybutadiene, such as FUREN 88 obtained from Asahi Chemicals of Yako, Kawasakiku, Kawasakishi, Japan; KURRARAY TP251, a trans-polyisoprene commercially available from KURRARAY CO.; LEVAPREN 700HV, an ethylene-vinyl acetate copolymer commercially available from Bayer-Rubber Division, Akron, Ohio; and VESTENAMER 8012, a trans-polycyclooctenenamer commercially available from Huls America Inc. of Tallmadge, Ohio. Some suitable reinforcing polymer components are listed in Table 1 below with their crystalline melt temperature ($T_C$) and/or $T_G$.

TABLE 1

REINFORCING POLYMER COMPONENTS

| Polymer Type | Tradename | $T_C$ (° C.) | $T_G$ (° C.) |
|---|---|---|---|
| Trans-polyisoprene | KURRARAY TP251 | 60 | −59 |
| Trans-polybutadiene | FUREN 88 | 84 | −88 |
| Polyethylene | Dow LPDE | 98 | −25 |
| Trans-polycyclo octenenamer | VESTENAMER 8012 | 54 | |

Another polymer particularly suitable for use in the reinforcing polymer component is a rigidifying polybutadiene component, which typically includes at least about 80 percent trans-isomer content with the remainder being cis-isomer 1,4-polybutadiene and vinyl-isomer 1,2-polybutadiene. Thus, it may be referred to herein as a "high trans-isomer polybutadiene" or a "rigidifying polybutadiene" to distinguish it from the cis-isomer polybutadienes or polybutadienes having a low trans-isomer content, i.e., typically below 80 percent, used to form the golf ball cores of the invention. The vinyl-content of the rigidifying polybutadiene component is preferably present in no more than about 15 percent, preferably less than about 10 percent, more preferably less than about 5 percent, and most preferably less than about 3 percent of the polybutadiene isomers.

The rigidifying polybutadiene component, when used in a golf ball of the invention, preferably has a polydispersity of no greater than about 4, preferably no greater than about 3, and more preferably no greater than about 2.5. The polydispersity, or PDI, is a ratio of the molecular weight average ($M_w$) over the molecular number average ($M_n$) of a polymer.

In addition, the rigidifying polybutadiene component, when used in a golf ball of the invention, typically has a high absolute molecular weight average, defined as being at least about 100,000, preferably from about 200,000 to about 1,000,000. In one embodiment, the absolute molecular weight average is from about 230,000 to about 750,000. In another embodiment, the molecular weight is about 275,000 to about 700,000. In any embodiment where the vinyl-content is present in greater than about 10 percent, the absolute molecular weight average is preferably greater than about 200,000.

When trans-polyisoprene or high trans-isomer polybutadiene is included in the reinforcing polymer component, it may be present in an amount of about 10 to about 40 weight percent, preferably about 15 to about 30 weight percent, more preferably about 15 to no more than about 25 weight percent of the polymer blend, i.e., the resilient and reinforcing polymer components.

The same crosslinking agents mentioned above with regard to the core may be used in this embodiment to achieve the desired elastic modulus for the resilient polymer-reinforcing polymer blend. In one embodiment, the crosslinking agent is added in an amount from about 1 to about 50 pph of the polymer blend, preferably about 20 to about 45 pph, and more preferably about 30 to about 40 pph, of the polymer blend.

The resilient polymer component, reinforcing polymer component, free-radical initiator, and any other materials used in forming an intermediate layer of a golf ball core in accordance with invention may be combined by any type of mixing known to one of ordinary skill in the art.

The intermediate layer may also be formed from the compositions as disclosed in U.S. Pat. No. 5,688,191, the entire disclosure of which is incorporated by reference herein, which are listed in Table 2 below.

TABLE 2

INTERMEDIATE LAYER COMPOSITIONS AND PROPERTIES

| Sample | Hardness (Shore D) | Resilience | Flex Modulus (psi) | Tensile Modulus (psi) | % Strain at Break |
|---|---|---|---|---|---|
| A  0% Estane 58091 100% Estane 58861 | 28 | 54 | 1,720 | 756 | 563 |

TABLE 2-continued

INTERMEDIATE LAYER COMPOSITIONS AND PROPERTIES

| | Sample | Hardness (Shore D) | Resilience | Flex Modulus (psi) | Tensile Modulus (psi) | % Strain at Break |
|---|---|---|---|---|---|---|
| B | 25% Estane 58091<br>75% Estane 58861 | 34 | 41 | 2,610 | 2,438 | 626 |
| C | 50% Estane 58091<br>50% Estane 58861 | 44 | 31 | 10,360 | 10,824 | 339 |
| D | 75% Estane 58091<br>25% Estane 58861 | 61 | 34 | 43,030 | 69,918 | 149 |
| E | 100% Estane 58091<br>0% Estane 58861 | 78 | 46 | 147,240 | 211,288 | 10 |
| A | 0% Hytrel 5556<br>100% Hytrel 4078 | 40 | 47 | 8,500 | 7,071 | 527 |
| B | 25% Hytrel 5556<br>75% Hytrel 4078 | 43 | 51 | 10,020 | 9,726 | 441 |
| C | 50% Hytrel 5556<br>50% Hytrel 4078 | 45 | 47 | 12,280 | 10,741 | 399 |
| D | 75% Hytrel 5556<br>25% Hytrel 4078 | 48 | 53 | 13,680 | 13,164 | 374 |
| E | 100% Hytrel 5556<br>0% Hytrel 4078 | 48 | 52 | 12,110 | 15,231 | 347 |
| A | 0% Hytrel 5556<br>100% Hytrel 3078 | 30 | 62 | 3,240 | 2,078 | 810 no break |
| B | 25% Hytrel 5556<br>75% Hytrel 3078 | 37 | 59 | 8,170 | 5,122 | 685 |
| C | 50% Hytrel 5556<br>50% Hytrel 3078 | 44 | 55 | 15,320 | 10,879 | 590 |
| D | 75% Hytrel 5556<br>25% Hytrel 3078 | 53 | 50 | 19,870 | 16,612 | 580 |
| E | 100% Hytrel 5556<br>0% Hytrel 3078 | 58 | 50 | 54,840 | 17,531 | 575 |
| A | 0% Hytrel 4078<br>100% Pebax 4033 | 46 | 51 | 11,150 | 8,061 | 597 |
| B | 25% Hytrel 4078<br>75% Pebax 4033 | 46 | 53 | 10,360 | 7,769 | 644 |
| C | 50% Hytrel 4078<br>50% Pebax 4033 | 45 | 52 | 9,780 | 8,117 | 564 |
| D | 75% Hytrel 4078<br>25% Pebax 4033 | 42 | 53 | 9,310 | 7,996 | 660 |
| E | 100% Hytrel 3078<br>0% Pebax 4033 | 40 | 51 | 9,250 | 6,383 | 531 |
| A | 0% Hytrel 3078<br>100% Estane 58091 | 77 | 50 | 156,070 | 182,869 | 9 |
| B | 25% Hytrel 3078<br>75% Estane 58091 | 65 | 48 | 87,680 | 96,543 | 33 |
| C | 50% Hytrel 3078<br>50% Estane 58091 | 52 | 49 | 53,940 | 48,941 | 102 |
| D | 75% Hytrel 3078<br>25% Estane 58091 | 35 | 54 | 12,040 | 6,071 | 852 |
| E | 100% Hytrel 3078<br>0% Estane 58091 | 29 | 50 | 3,240 | 2,078 | 810 no break |
| A | 100% Kraton 1921<br>0% Estane 58091<br>0% Surlyn 7940 | 29 | 59 | 24,300 | 29,331 | 515 |
| B | 50% Kraton 1921<br>50% Estane 58091<br>0% Surlyn 7940 | 57 | 49 | 56,580 | — | 145 |
| C | 50% Kraton 1921<br>0% Estane 58091<br>50% Surlyn 7940 | 56 | 55 | 28,290 | 28,760 | 295 |
| A | 33.3% Pebax 4033<br>33.3% Estane 58091<br>33.3% Hytrel 3078 | 48 | 50 | 41,240 | 30,032 | 294 |
| B | 30% Pebax 4033<br>40% Estane 58091<br>10% Hytrel 3078 | 48 | 50 | 30,650 | 14,220 | 566 |
| C | 20% Pebax 4033<br>40% Estane 58091<br>40% Hytrel 3078 | 41 | 54 | 24,020 | 16,630 | 512 |

The intermediate layer may also be a tensioned elastomeric material wound around a solid, semi-solid, hollow, fluid-filled, or powder-filled center. A wound layer may be described as a core layer or an intermediate layer for the purposes of the invention. As an example, the golf ball may include a core layer, a tensioned elastomeric layer wound thereon, and a cover layer. In particular, the golf ball may have a core made of a reaction product containing a metallic mercaptothiazole or metallic mercaptobenzothiazole, an intermediate layer including a tensioned elastomeric material and a cover. The tensioned elastomeric material may be formed of any suitable material known to one of ordinary skill in the art.

In one embodiment, the tensioned elastomeric material incorporates the reaction product discussed above. The tensioned elastomeric material may also be formed conventional polyisoprene.

In one embodiment, the tensioned elastomeric layer is a high tensile filament having a tensile modulus of about 10,000 kpsi or greater, as disclosed in co-pending U.S. patent application Ser. No. 09/842,829, filed Apr. 27, 2001, entitled "All Rubber Golf Ball with Hoop-Stress Layer," the entire disclosure of which is incorporated by reference herein. In another embodiment, the tensioned elastomeric layer is coated with a binding material that will adhere to the core and itself when activated, causing the strands of the tensioned elastomeric layer to swell and increase the cross-sectional area of the layer by at least about 5 percent. An example of such a golf ball construction is provided in co-pending U.S. patent application Ser. No. 09/841,910, the entire disclosure of which is incorporated by reference herein.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are disclosed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In one embodiment of the present invention, the interstitial material may extend from the intermediate layer into the core. In an alternative embodiment, the interstitial material can also be embedded in the cover, or be in contact with the inner surface of the cover, or be embedded only in the cover.

At least one intermediate layer may also be a moisture barrier layer, such as the ones described in U.S. Pat. No. 5,820,488, which is incorporated by reference herein. Any suitable film-forming material having a lower water vapor transmission rate than the other layers between the core and the outer surface of the ball, i.e., cover, primer, and clear coat. Examples include, but are not limited to polyvinylidene chloride, vermiculite, and a reaction product with fluorine gas. In one embodiment, the moisture barrier layer has a water vapor transmission rate that is sufficiently low to reduce the loss of CoR of the golf ball by at least 5 percent if the ball is stored at 100° F. and 70 percent relative humidity for six weeks as compared to the loss in CoR of a golf ball that does not include the moisture barrier, has the same type of core and cover, and is stored under substantially identical conditions.

Other Additives

Additional materials may be included in the intermediate layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the intermediate layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

Cover

The cover provides the interface between the ball and a club. Properties that are desirable for the cover are good moldability, high abrasion resistance, high tear strength, high resilience, and good mold release, among others.

As used herein, the term "cover" means the outermost portion of a golf ball. A cover typically includes at least one layer and may contain indentations such as dimples and/or ridges. Paints and/or laminates are typically disposed about the cover to protect the golf ball during use thereof.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge or plasma treatment prior to forming the cover around it. Other layers of the ball, e.g., the core, also may be surface treated. Examples of these and other surface treatment techniques can be found in U.S. Pat. No. 6,315,915, the entirety of which is incorporated by reference herein.

In one embodiment, at least one cover layer includes about 1 percent to about 100 percent of the compositions of the invention. In particular, the cover may be formed from the reaction product that includes a resilient polymer component; a free radical source; at least one of a metallic mercaptothiazole of formula I or a metallic mercaptobenzothiazole of formula II; and optionally one or more cis-to-trans catalyst, crosslinking agent, or filler, as described hereinabove.

In addition, the cover can include any suitable cover or intermediate layer materials, known to one of ordinary skill in the art, including thermoplastic and thermosetting materials, but preferably the cover or intermediate layer can include any suitable materials, such as ionic copolymers of ethylene and an unsaturated monocarboxylic acid which are available under the trademark SURLYN of E. I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid. In one embodiment, the carboxylic acid groups are neutralized from about 10 percent to about 100 percent.

This golf ball can likewise include one or more homopolymeric or copolymeric cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly (caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of King of Prussia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E. I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In one embodiment, the cover includes one or more homopolymeric or copolymeric cover materials, including but not limited to, thermoset polyurethane, thermoplastic polyurethane, thermoset polyurea, thermoplastic polyurea, thermoset elastomer, thermoplastic elastomer or thermoplastic ionomer. In another embodiment, the cover includes one or more homopolymeric or copolymeric cover materials that is light stable.

Preferably, the cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly (ethylene terephthalate), poly(butylene terephthalate), poly (ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer.

In another embodiment, the cover material is formed from polyurea, which is disclosed in co-pending U.S. patent application Ser. Nos. 10/238,729, 10/256,011, 10/066,637 and 10/228,311, the entire disclosures of which are incorporated herein by reference.

The cover layer(s) may also be formed from composition blends as discussed above. For example, in one embodiment, at least one cover layer is formed from a blend of about 5 percent to about 95 percent of a reaction product that includes at least one of a metallic mercaptothiazole of formula I, a metallic mercaptobenzothiazole of formula II, or a mixture thereof and about 95 percent to about 5 percent other polymers and/or other materials. In another embodiment, at least one cover layer is formed from a blend of about 10 percent to about 90 percent a reaction product that includes at least one of a metallic mercaptothiazole of formula I, a metallic mercaptobenzothiazole of formula I, or a mixture thereof and about 90 percent to about 10 percent other polymers and/or other materials. In yet another embodiment, the cover compositions include from about 25 percent to about 75 percent a reaction product that includes at least one of a metallic mercaptothiazole of formula I, a metallic mercaptobenzothiazole of formula I, or a mixture thereof and about 75 percent to about 25 percent other polymers and/or other materials, such as those listed above. In yet another embodiment, the cover compositions include from about 15 percent to about 40 percent a reaction product that includes at least one of a metallic mercaptothiazole of formula I, a metallic mercaptobenzothiazole of formula I, or a mixture thereof and about 60 percent to about 85 percent other polymers and/or other materials, such as those listed above. In yet another embodiment, the cover compositions include from about 20 percent to about 50 percent a reaction product that includes at least one of a metallic mercaptothiazole of formula I, a metallic mercaptobenzothiazole of formula I, or a mixture thereof and about 80 percent to about 50 percent other polymers and/or other materials, such as those listed above. As noted above, the upper and lower limits of the ranges disclosed herein may be interchanged to form new ranges. For example, In yet another embodiment, the cover compositions include from about 10 percent to about 40 percent a reaction product that includes at least one of a metallic mercaptothiazole of formula I, a metallic mercaptobenzothiazole of formula I, or a mixture thereof and about 60 percent to about 90 percent other polymers and/or other materials, such as those listed above.

In one embodiment, an intermediate cover layer may be formed from at least one polymer containing α,β-unsaturated carboxylic acid groups, or the salts thereof, that have been 100 percent neutralized by organic fatty acids. The organic acids are aliphatic, mono-functional (saturated, unsaturated, or multi-unsaturated) organic acids. Salts of these organic acids may also be used, including salts of barium, lithium, sodium, zinc, bismuth, chromium, cobalt, copper, potassium, strontium, titanium, tungsten, magnesium, cesium, iron, nickel, silver, aluminum, tin, or calcium; as well as salts of fatty acids, particularly stearic, bebenic, erucic, oleic, or linoelic acids or dimerized derivatives thereof. It is preferred that the organic acids and salts of the present invention be relatively non-migratory (i.e., they do not bloom to the surface of the polymer under ambient temperatures) and non-volatile (they do not volatilize at temperatures required for melt-blending).

The acid moieties of the highly-neutralized polymers ("HNP"), typically ethylene-based ionomers, are preferably neutralized greater than about 70 percent, more preferably greater than about 90 percent, and most preferably at least about 100 percent. The HNP's may be also be blended with a second polymer component, which, if containing an acid group, may be neutralized in a conventional manner, by organic fatty acids, or both. The second polymer component, which may be partially or fully neutralized, preferably includes ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

The cover typically has a thickness to provide sufficient strength, good performance characteristics and durability. The cover of the golf balls typically has a thickness of at least about 0.03 inches, preferably 0.03 to 0.125 inches, and more preferably from about 0.05 to 0.1 inches. The golf balls also typically have at least about 60 percent dimple coverage, preferably at least about 70 percent dimple coverage, of the surface area of the cover.

Typically, the covers are formed around the solid or wound cores by compression molding preformed half-shells of the cover stock material, casting, or injection molding the cover stock about the core, including reaction injection molding and liquid injection molding ("LIM"). Half-shells are made by injection molding a cover stock into a conventional half-shell mold in a conventional manner. The preferred method is compression molding of preformed half-shells.

The cover may include a plurality of layers, e.g., an inner cover layer disposed about a golf ball center and an outer cover layer formed thereon. For example, the present invention encompasses a golf ball having a core, a thin inner cover layer, and a thin outer cover layer disposed thereon. In particular, the core may be formed of a reaction product including a metallic mercaptothiazole of the present invention, the inner cover layer formed of an ionomer blend, and the outer cover layer formed of a polyurea composition.

In another embodiment, the outer cover layer has a different hardness than the inner cover layer. In one embodiment, the inner cover layer has a hardness from about 30 Shore D to about 75 Shore D. In another embodiment, the inner cover layer has a hardness from about 40 Shore D to about 70 Shore D. In yet another embodiment, the inner cover layer has a hardness from about 50 Shore D to about 60 Shore D. In one embodiment, the outer cover layer has a hardness from about 25 Shore D to about 65 Shore D. In another embodiment, the outer cover layer has a hardness from about 40 Shore D to about 60 Shore D. In yet another embodiment, the outer cover layer has a hardness from about 45 Shore D to about 55 Shore D.

In one embodiment, the difference in hardness of the outer cover layer and the inner cover layer is from about 5 Shore D to about 50 Shore D. In another embodiment, the difference in hardness of the outer cover layer and the inner cover layer is from about 10 Shore D to about 30 Shore D. In yet another embodiemt, the difference in hardness of the outer cover layer and the inner cover layer is from about 15 Shore D to about 20 Shore D. Depending on the desired performance and field, the hardness of the inner cover layer may be greater than the hardness of the outer cover layer, or the hardness of the inner cover layer may be less than the hardness of the outer cover layer.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

In one such embodiment, both covers layers can be formed of the same material and have essentially the same hardness, but the layers are designed to have different coefficient of friction values. In another embodiment, the compositions of the invention are used in a golf ball with multiple cover layers having essentially the same hardness, but different rheological properties under high deformation. Another aspect of this embodiment relates to a golf ball with multiple cover layers having essentially the same hardness, but different thicknesses to simulate a soft outer cover over hard inner cover ball.

In another aspect of this concept, the cover layers of a golf ball have essentially the same hardness, but different properties at high or low temperatures as compared to ambient temperatures. In particular, this aspect of the invention is directed to a golf ball having multiple cover layers wherein the outer cover layer composition has a lower flexural modulus at reduced temperatures than the inner cover layer, while the layers retain the same hardness at ambient and reduced temperatures, which results in a simulated soft outer cover layer over a hard inner cover layer feel. For example, certain polyureas may have a much more stable flexural modulus at different temperatures than ionomer resins and thus, could be used to make an effectively "softer" layer at lower temperatures than at ambient or elevated temperatures.

Yet another aspect of this concept relates to a golf ball with multiple cover layers having essentially the same hardness, but different properties under wet conditions as compared to dry conditions. Wettability of a golf ball layer may be affected by surface roughness, chemical heterogeneity, molecular orientation, swelling, and interfacial tensions, among others. Thus, non-destructive surface treatments of a golf ball layer may aid in increasing the hydrophilicity of a layer, while highly polishing or smoothing the surface of a golf ball layer may decrease wettability. U.S. Pat. Nos. 5,403,453 and 5,456,972 disclose methods of surface treating polymer materials to affect the wettability, the entire disclosures of which are incorporated by reference herein. In addition, plasma etching, corona treating, and flame treating may be useful surface treatments to alter the wettability to desired conditions. Wetting agents may also be added to the golf ball layer composition to modify the surface tension of the layer.

Thus, the differences in wettability of the cover layers according to the invention may be measured by a difference in contact angle. The contact angles for a layer may be from about 1° (low wettability) to about 180° (very high wettability). In one embodiment, the cover layers have contact angles that vary by about 1° or greater. In another embodiment, the contact angles of the cover layers vary by about 3° or greater. In yet another embodiment, the contact angles of the cover layers vary by about 5° or greater.

Other non-limiting examples of suitable types of ball constructions that may be used with the present invention include those described in U.S. Pat. Nos. 6,056,842, 5,688, 191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Methods of Forming Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of injection molding using a split vent pin can be found in co-pending U.S. patent application Ser. No. 09/742,435, filed Dec. 22, 2000, entitled "Split Vent Pin for Injection Molding." Examples of retractable pin injection molding may be found in U.S. Pat. Nos. 6,129,881, 6,235, 230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784, 5,484,870, and, the disclosures of which are incorporated herein by reference in their entirety.

Forming the Core Layer(s)

The cores of the invention may be formed by any suitable method known to one of ordinary skill in art. When the cores are formed from a thermoset material, compression molded is a particularly suitable method of forming the core. In a thermoplastic core embodiment, on the other hand, the cores may be injection molded.

Suitable methods include single pass mixing (ingredients are added sequentially), multi-pass mixing, and the like. The crosslinking agent, and any other optional additives used to modify the characteristics of the golf ball center or additional layer(s), may similarly be combined by any type of mixing. Suitable mixing equipment is well known to one of ordinary skill in the art, and such equipment may include a Banbury mixer, a two-roll mill, or a twin screw extruder. Suitable mixing speeds and temperatures are well-known to one of ordinary skill in the art, or may be readily determined without undue experimentation.

The mixture can be subjected to, e.g., a compression or injection molding process, and the molding cycle may have a single step of molding the mixture at a single temperature for a fixed-time duration. In one embodiment, a single-step cure cycle is employed. Although the curing time depends on the various materials selected, a suitable curing time is about 5 minutes to about 18 minutes, preferably from about 8 minutes to about 15 minutes, and more preferably from about 10 minutes to about 12 minutes. An example of a single step molding cycle, for a mixture that contains dicumyl peroxide, would hold the polymer mixture at 171° C. (340° F.) for a duration of 15 minutes. An example of a two-step molding cycle would be holding the mold at 143° C. (290° F.) for 40 minutes, then ramping the mold to 171° C. (340° F.) where it is held for a duration of 20 minutes. One of ordinary skill in the art will be readily able to adjust the curing time based on the particular materials used and the discussion herein.

Furthermore, U.S. Pat. Nos. 6,180,040 and 6,180,722 disclose methods of preparing dual core golf balls. The entire disclosures of these patents are hereby incorporated by reference herein.

Forming the Intermediate Layer(s)

The intermediate layer may also be formed from using any suitable method known to one of ordinary skill in the art. For example, an intermediate layer may be formed by blow molding and covered with a dimpled cover layer formed by injection molding, compression molding, casting, vacuum forming, powder coating, and the like.

For example, castable reactive liquid materials, such as the reaction products of the invention may be applied over the inner ball using a variety of application techniques such as spraying, compression molding, dipping, spin coating, or flow coating methods that are well known in the art. In one embodiment, the castable reactive reaction product is formed over the core using a combination of casting and compression molding. Conventionally, compression molding and injection molding are applied to thermoplastic cover materials, whereas RIM, liquid injection molding, and casting are utilized on thermoset cover techniques.

Forming the Cover Layer(s)

The reaction products of the invention may be applied over an inner ball using a variety of application techniques such as spraying, compression molding, dipping, spin coating, or flow coating methods that are well known in the art. In one embodiment, the reaction product is used to form a cover over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is incorporated by reference herein, discloses a useful method for forming a polyurethane cover on a golf ball core. Because this method relates to the use of both casting thermosetting and thermoplastic material as the golf ball cover, wherein the cover is formed around the core by mixing and introducing the material in mold halves, the reaction products of the invention may also be used employing the same casting process.

For example, once the reaction product is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for a period of time, a core is lowered at a controlled speed into the gelling reacting mixture. While the length of time needed for gelling may vary, it is preferred that the reacting materials reside in the top mold halves for about 20 seconds to about 180 seconds, preferably from about 40 seconds to about 100 seconds, and more preferably for about 70 seconds to about 80 seconds, before a core is lowered into the gelling reacting mixture.

A ball cup holds the ball core through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to about 10 seconds. The mold halves, with core and solidified cover half thereon, are removed from the centering fixture unit, inverted and mated with second mold halves which, at an appropriate time earlier, have had a selected quantity of reacting prepolymer and curing agent introduced therein to commence gelling.

Similarly, U.S. Pat. No. 5,006,297 and U.S. Pat. No. 5,334,673 both also disclose suitable molding techniques that may be utilized to apply the castable reactive liquids employed in the present invention. However, the method of the invention is not limited to the use of these techniques; other methods known to those skilled in the art may also be employed. For instance, other methods for holding the ball core may be utilized instead of using a partial vacuum.

Dimples

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281.

In one embodiment of the present invention, the golf ball has an icosahedron dimple pattern that includes 20 triangles made from about 362 dimples and, except perhaps for the mold parting line, does not have a great circle that does not intersect any dimples. Each of the large triangles, preferably, has an odd number of dimples (7) along each side and the small triangles have an even number of dimples (4) along each side. To properly pack the dimples, the large triangle has nine more dimples than the small triangle. In another embodiment, the ball has five different sizes of dimples in total. The sides of the large triangle have four different sizes of dimples and the small triangles have two different sizes of dimples.

In another embodiment of the present invention, the golf ball has an icosahedron dimple pattern with a large triangle including three different dimples and the small triangles having only one diameter of dimple. In a preferred embodiment, there are 392 dimples and one great circle that does not intersect any dimples. In another embodiment, more than five alternative dimple diameters are used.

In one embodiment of the present invention, the golf ball has an octahedron dimple pattern including eight triangles made from about 440 dimples and three great circles that do not intersect any dimples. In the octahedron pattern, the pattern includes a third set of dimples formed in a smallest triangle inside of and adjacent to the small triangle. To properly pack the dimples, the large triangle has nine more dimples than the small triangle and the small triangle has nine more dimples than the smallest triangle. In this embodiment, the ball has six different dimple diameters distributed over the surface of the ball. The large triangle has five different dimple diameters, the small triangle has three different dimple diameters and the smallest triangle has two different dimple diameters.

Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated by reference herein.

The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer.

In an alternative embodiment, the golf ball may have a non-planar parting line allowing for some of the plurality of pyramidal projections to be disposed about the equator. Such a golf ball may be fabricated using a mold as disclosed in co-pending U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections.

Several additional non-limiting examples of dimple patterns with varying sizes of dimples are also provided in U.S. Pat. No. 6,358,161 and U.S. Pat. No. 6,213,898, the entire disclosures of which are incorporated by reference herein.

The total number of dimples on the ball, or dimple count, may vary depending on such factors as the dimple size and the selected pattern. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, is contemplated for use with the golf balls of the present invention.

Golf Ball Post-Processing

The golf balls of the present invention may be painted, coated, or surface treated for further benefits.

For example, golf balls covers frequently contain a fluorescent material and/or a dye or pigment to achieve the desired color characteristics. A golf ball of the invention may also be treated with a base resin paint composition, however, as disclosed in U.S. Patent Publication No. 2002/0082358, which includes a 7-triazinylamino-3-phenylcoumarin derivative as the fluorescent whitening agent to provide improved weather resistance and brightness.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. patent application Ser. No. 10/012,538, filed Dec. 12, 2001, entitled, "Method of Forming Indicia on a Golf Ball," the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, the entirety of which is incorporated by reference herein.

Protective and decorative coating materials, as well as methods of applying such materials to the surface of a golf ball cover, are well known in the golf ball art. Generally, such coating materials include urethanes, urethane hybrids, epoxies, polyesters and acrylics. If desired, more than one coating layer can be used. The coating layer(s) may be applied by any suitable method known to one of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.700 to about 1.950 inches can be used. Preferably, the overall diameter of the core and all intermediate layers is about 80 percent to about 98 percent of the overall diameter of the finished ball.

The core may have a diameter ranging from about 0.090 inches to about 1.650 inches. In one embodiment, the diameter of the core of the present invention is about 1.200 inches to about 1.630 inches. In another embodiment, the diameter of the core is about 1.300 inches to about 1.600 inches, preferably from about 1.390 inches to about 1.600 inches, and more preferably from about 1.500 inches to about 1.600 inches. In yet another embodiment, the core has a diameter of about 1.550 inches to about 1.650 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.540 inches or greater, preferably about 1.550 inches or greater. In one embodiment, the core diameter is about 1.590 inches or greater. In another embodiment, the diameter of the core is about 1.640 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer is between about 0.02 inches to about 0.045 inches. In still another embodiment, the outer cover layer is about 0.025 to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

The molding process and composition of golf ball portions typically results in a gradient of material properties. Methods employed in the prior art generally exploit hardness to quantify these gradients. Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

When a reaction product is incorporated into a core, the core may have a hardness gradient, i.e., a first hardness at a first point, i.e., at an interior location, and a second hardness at a second point, i.e., at an exterior surface, as measured on a molded sphere. In one embodiment, the second hardness is at least about 6 percent greater than the first hardness, preferably about 10 percent greater than the first hardness. In other embodiments, the second hardness is at least about 20 percent greater or at least about 30 percent greater, than the first hardness.

For example, the interior of the core may have a first hardness of about 45 Shore C to about 60 Shore C and the exterior surface of the core may have a second hardness of about 65 Shore C to about 75 Shore C. In one golf ball formulated according to the invention, the first hardness was about 51 Shore C and a second hardness was about 71 Shore C, providing a hardness difference of greater than 20 percent.

In one embodiment, however, the core has a substantially uniform hardness throughout. Thus, in this aspect, the first and second hardness preferably differ by about 5 percent or less, more preferably about 3 percent or less, and even more preferably by about 2 percent or less. In another embodiment, the hardness is uniform throughout the component.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 60 Shore D. In one embodiment, the cover has a hardness of about 40 Shore D to about 65 Shore D. In another embodiment, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D. In yet another embodiment, the cover hardness is from about 35 to 80 Shore D, preferably from about 40 to 75 Shore D, and more preferably from about 45 to 70 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 95 Shore C or less, preferably about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Depending on the desired properties, balls prepared according to the invention can exhibit substantially the same or higher resilience, or coefficient of restitution (CoR), with a decrease in compression or modulus, compared to balls of conventional construction. As used herein, the term "coefficient of restitution" (CoR) is calculated by dividing the rebound velocity of the golf ball by the incoming velocity when a golf ball is shot out of an air cannon. The CoR testing is conducted over a range of incoming velocities and determined at an inbound velocity of 125 ft/s. Additionally, balls prepared according to the invention can also exhibit substantially higher resilience, or coefficient of restitution (CoR), without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at $-50°$ C. Preferably, the dynamic stiffness should be between about 10,000 and 40,000 N/m at $-50°$ C., more preferably, the dynamic stiffness should be between about 20,000 and 30,000 N/m at $-50°$ C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is a golf ball core. The reaction product preferably has a loss tangent below about 0.1 at $-50°$ C., and more preferably below about 0.07 at $-50°$ C.

There is currently no USGA limit on the CoR of a golf ball, but the initial velocity of the golf ball cannot exceed 250+5 feet/second (ft/s). Thus, in one embodiment, the initial velocity is about 245 ft/s or greater and about 255 ft/s or less. In another embodiment, the initial velocity is about 250 ft/s or greater. In one embodiment, the initial velocity is about 250 ft/s to about 255 ft/s. In another embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize CoR without violating the 255 ft/s limit. In a one-piece solid golf ball, the CoR will depend on a variety of characteristics of the ball, including its composition and hardness. For a given composition, CoR will generally increase as hardness is increased. In a two-piece solid golf ball, e.g., a core and a cover, one of the purposes of the cover is to produce a gain in CoR over that of the core. When the contribution of the core to high CoR is substantial, a lesser contribution is required from the cover. Similarly, when the cover contributes substantially to high CoR of the ball, a lesser contribution is needed from the core.

The resultant golf balls typically have a coefficient of restitution of greater than about 0.7, preferably greater than about 0.75, and more preferably greater than about 0.78. In one embodiment, golf balls that have a CoR from about 0.7 to about 0.820. In another embodiment, the ball has a CoR of about 0.800 or greater. In addition, the inner ball preferably has a CoR of about 0.810 or more. In one embodiment, the CoR is about 0.815 or greater.

The golf balls also typically have an Atti compression (which has been referred to as PGA compression in the past) of at least about 40, preferably from about 50 to 120, and more preferably from about 60 to 100. Preferably, golf balls have an Atti compression of 80 or greater, more preferably 90 or greater, most preferably 95 or greater. As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball core. Compression values are dependent on the diameter of the article being measured. The golf ball polybutadiene material of the present invention typically has a flexural modulus of from about 500 psi to 300,000 psi, preferably from about 2000 to 200,000 psi. The golf ball polybutadiene material typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material. The dynamic shear storage modulus, or storage modulus, of the golf ball polybutadiene material at about $23°$ C. is typically at least about 10,000 dyn/cm$^2$, preferably from about $10^4$–$10^{10}$ dyn/cm$^2$, more preferably from about $10^6$ to $10^{10}$ dyn/cm$^2$.

Compression values are dependent on the diameter of the component being measured. The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25. In yet another embodiment, the core compression is zero or negative compression (i.e., below zero).

In an alternative, low compression embodiment, the core has a compression less than about 20, more preferably less than about 10, and most preferably, 0. As known to one of ordinary skill in the art, however, the cores generated according to the present invention may be below the measurement of the Atti Compression Gauge. In an embodiment where the core is hard, the compression may be about 90 or greater. In one embodiment, the compression of the hard core ranges from about 90 to about 100.

The core of the present invention may also have a Soft Center Deflection Index (SCDI) compression of less than about 160, more preferably, between about 40 and about 160, and most preferably, between about 60 and about 120.

Flexural Modulus

Accordingly, it is preferable that the golf balls of the present invention have an intermediate layer with a flexural modulus of about 500 psi to about 500,000 psi. More preferably, the flexural modulus of the intermediate layer is about 2,000 psi to about 200,000 psi. Most preferably, the flexural modulus of the intermediate layer is about 2,000 psi to about 200,000 psi. Flexural modulus is a material property that measures the flexural modulus of the material itself, rather than being a measurement of the golf ball or component (i.e., cover, intermediate layer or core). For example, the flexural modulus of a cover, as referred to herein, is a measurement of the flexural modulus of the materials that comprise the cover, rather than the cover itself. Likewise, the flexural modulus of the intermediate layer, as referred to herein, is a measurement of the flexural modulus of the materials that comprise the intermediate layer, rather than the cover itself.

The flexural modulus of the cover on the golf balls, as measured by ASTM method D-790, is typically greater than about 500 psi, and is preferably from about 500 psi to about 150,000 psi. The flexural moduli of the cover layer is preferably about 2,000 psi or greater, and more preferably about 5,000 psi or greater. In one embodiment, the flexural moduli of the cover is from about 5,000 psi to about 100,000 psi, more preferably from about 15,000 psi to about 80,000 psi, and most preferably from about 18,000 psi to about 65,000 psi. In another embodiment, the flexural moduli of the cover layer is about 100,000 psi or less, preferably about 80,000 or less, and more preferably about 70,000 psi or less. In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer including the compositions of the invention is preferably at least about 0.7. The specific gravity of a cover including the compositions of the invention is from about 0.8 to about 1.15, preferably from about 0.9 to about 1.10, and more preferably from about 0.95 to about 1.05. The specific gravity of an intermediate layer including the compositions of the invention is from about 0.9 to about 5.0, preferably from about 0.95 to about 4, and more preferably from about 1.0 to about 3.0.

In another embodiment, the specific gravity of a cover or intermediate layer including the compositions of the invention is at least about 0.6. In yet another embodiment, the specific gravity of the cover or intermediate layer is at last about 1.0, preferably at least about 0.9 and more preferably at least about 0.8.

The specific gravity of a core including the compositions of the invention is greater than 1.5, more preferably greater than 1.8 and more preferably greater than 2.0. In another embodiment, the specific gravity of the fore including the compositions of the invention is greater than 2.5, and can be as high as 5.0 and 10.0.

Adhesion Strength

The adhesion, or peel, strength of the compositions of the invention is preferably about 5 $lb_f/in$ or greater. In one embodiment, the adhesion strength is about 25 $lb_f/in$ or less. For example, the adhesion strength is preferably about 10 $lb_f/in$ or more and about 20 $lb_f/in$ or less. In another embodiment, the adhesion strength is from about 12 $lb_f/in$ or more and about 18 $lb_f/in$ or less.

Shear/Cut Resistance

The cut resistance of a golf ball cover may be determined using a shear test having a scale from 1 to 9 assessing damage and appearance. The scale for this shear test is known to one of ordinary skill in the art. In one embodiment, the damage rank is preferably about 3 or less, more preferably about 2 or less. In another embodiment, the damage rank is about 1 or less. The appearance rank of a golf ball of the invention is preferably about 3 or less. In one embodiment, the appearance rank is about 2 or less, preferably about 1 or less.

Ball Spin

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist Pinnacle Gold golf ball that gives a ball speed of about 159 to about 161 miles/hour, a launch angle of about 9.0 degrees to about 10.0 degrees, and a spin rate of about 2900 rpm to about 3100 rpm. Thus in one embodiment, the spin rate of a golf ball hit with a golf club driver under such test condtions is between about 2,000 rpm to about 4,000 rpm. In a preferred embodiment, the spin rate of a golf ball hit with a golf club driver is between about 2,500 rpm to about 3,500 rpm, more preferably between about 2,800 and 3,200 rpm.

For an 8-iron ball spin test, a spin rate of a golf ball struck by a standard 8-iron club was obtained by using test conditions for a Titleist Pro VI golf ball that gives a ball speed of about 114 to about 116 miles/hour, a launch angle of about 18.5 to about 19.5 degrees and a spin rate of about 8100 rpm to about 8300 rpm. Thus in one embodiment, the spin rate of cleanly struck 8-iron shot under such test condtions is between 6,500 rpm and 10,000 rpm. In preferred embodiment, the spin rate of an average, cleanly struck 8-iron shot is between 7,500 rpm and 9,000 rpm, more preferably between about 8,000 rpm and 9,000 rpm.

EXAMPLES

The following examples are illustrative of the invention:

Example 1

Cores Prepared In Accordance to the Invention Utilizing Metallic Mercaptobenzothiazole Cores were prepared according to the present invention and utilizes zinc mercaptobenzothiazole as the metallic mercaptobenzothiazole component. The resultant core properties clearly demonstrate the advantages of a golf ball core made according to the present invention compared to cores constructed but do not utilize a metallic mercaptothiazole or metallic mercaptobenzothiazole component.

Cores were prepared using base formulations in the presence and absence of zinc pentachlorothiophenol (ZnPCTP), which are shown in Tables 1 and 2.

TABLE 1

(Non-ZnPCTP formulation)

|  | 1 | 2 | 3 | 4 | 5 | 6 | 7 | 8 |
|---|---|---|---|---|---|---|---|---|
| BUNA CB-23 | 94.9 | 94.9 | 94.9 | 94.9 | 94.1 | 94.1 | 94.1 | 94.1 |
| RD-1237 | 30.0 | 30.0 | 30.0 | 30.0 | 35.0 | 35.0 | 35.0 | 35.0 |
| AKTIPLAST PP | 4.1 | 4.1 | 4.1 | 4.1 | 4.0 | 4.0 | 4.0 | 4.0 |
| Zinc Oxide | 5.0 | 5.0 | 5.0 | 5.0 | 5.0 | 5.0 | 5.0 | 5.0 |
| PERKADOX BC | 0.50 | 0.50 | 0.50 | 0.50 | 0.50 | 0.50 | 0.50 | 0.50 |
| ZETAX | 0 | 2 | 3 | 5 | 0 | 2 | 3 | 5 |
| CoR | 0.800 | 0.810 | 0.810 | 0.812 | 0.810 | 0.818 | 0.820 | 0.820 |
| Compression | 40 | 55 | 60 | 66 | 61 | 76 | 79 | 84 |

TABLE 2

(ZnPCTP-containing formulation)

|  | 1 | 2 | 3 | 4 | 5 | 6 |
|---|---|---|---|---|---|---|
| BUNA CB-23 | 93.6 | 93.6 | 93.6 | 93.6 | 93.6 | 93.6 |
| RD-1237 | 37.5 | 37.5 | 37.5 | 37.5 | 37.5 | 37.5 |
| AKTIPLAST PP | 3.9 | 3.9 | 3.9 | 3.9 | 3.9 | 3.9 |
| Zinc Oxide | 5.0 | 5.0 | 5.0 | 5.0 | 5.0 | 5.0 |
| PERKADOX BC | 0.60 | 0.60 | 0.60 | 0.60 | 0.60 | 0.60 |
| ZnPCTP | 2.35 | 2.35 | 2.35 | 2.35 | 2.35 | 2.35 |
| ZETAX | 0 | 0.5 | 1.0 | 2.0 | 3.0 | 5.0 |
| CoR | 0.820 | 0.818 | 0.820 | 0.820 | 0.823 | 0.814 |
| Compression | 52 | 51 | 56 | 59 | 62 | 62 |

|  | 7 | 8 | 9 | 10 | 11 | 12 |
|---|---|---|---|---|---|---|
| BUNA CB-23 | 92.6 | 92.6 | 92.6 | 92.6 | 92.6 | 92.6 |
| RD-1237 | 43.8 | 43.8 | 43.8 | 43.8 | 43.8 | 43.8 |
| AKTIPLAST PP | 3.7 | 3.7 | 3.7 | 3.7 | 3.7 | 3.7 |
| Zinc Oxide | 5.0 | 5.0 | 5.0 | 5.0 | 5.0 | 5.0 |
| PERKADOX BC | 0.60 | 0.60 | 0.60 | 0.60 | 0.60 | 0.60 |
| ZnPCTP | 2.35 | 2.35 | 2.35 | 2.35 | 2.35 | 2.35 |
| ZETAX | 0 | 0.5 | 1.0 | 2.0 | 3.0 | 5.0 |
| CoR | 0.826 | 0.828 | 0.827 | 0.826 | 0.826 | 0.821 |
| Compression | 69 | 73 | 75 | 79 | 81 | 82 |

The base formulation was formed by combining BUNA CB-23 (a polybutadiene from Bayer), RD-1237 (80% active ZDA, 17% rubber and 3% processing aid from Rhein Chemie, N.J.), AKTIPLAST PP (a zinc-based processing agent from Rhein Chemie, N.J.), zinc oxide, and PERKADOX BC (dicumyl peroxide from Akzo Nobel). To each base formulation, ZETAX (zinc mercaptobenzothiazole, sold by R. T. Vanderbilt) was added in on the mill at 0 pph, 0.5 pph, 1.0 pph, 2.0 pph, 3.0 pph, and 5.0 pph. In non-ZnPCTP formulations, compression increases with each increase in ZETAX, while there was a gain in CoR similar to what an addition of zinc diacrylate would provide. In ZnPCTP formulations, compression increases with each increase in ZETAX, but the gain of CoR was low.

Example 2

Analysis Showing No Cis-to-Trans Isomerization in the Presence of a Metallic Mercaptobenzothiazole Fourier Transform Infrared Spectroscopy (FTIR) analysis of core formulations of the present invention shows that zinc mercaptobenzothiazole does not cause any cis-to-trans isomerization, as shown in Table 3.

TABLE 3

|  | 1 (pph) | 2 (pph) | 3 (pph) | 4 (pph) | 5 (pph) |
|---|---|---|---|---|---|
| BUNA CB-23 | 94.90 | 94.90 | 94.90 | 93.60 | 93.60 |
| RD-1237 | 30.00 | 30.00 | 30.00 | 37.50 | 37.50 |
| AKTIPLAST PP | 4.10 | 4.10 | 4.10 | 3.90 | 3.90 |
| ZnO | 5.00 | 5.00 | 5.00 | 5.00 | 5.00 |
| ZnPCTP | 0.00 | 0.00 | 0.00 | 2.35 | 2.35 |
| PERKADOX BC | 0.50 | 0.50 | 0.50 | 0.60 | 0.60 |
| Butyl Zimate | 0.00 | 2.00 | 0.00 | 0.00 | 0.00 |
| ZETAX | 0.00 | 0.00 | 2.00 | 0.00 | 2.00 |
| % Trans | 4 | 3 | 5 | 28 | 29 |

Formulations 1, 2, and 3 are based on base formulations 1–4 in Table 1 of Example 1. Formulation 2 contains 2.00 pph butyl zimate and formulation 3 contains 2.00 pph ZETAX. The control is formulation 1, which contains neither butyl zimate nor ZETAX. The FTIR analysis shows that there is 4% trans-polybutadiene in control formulation 1, 3% trans-polybutadiene in formulation 2 and 5% trans-polybutadiene in formulation 3. These results are indicative that cis-to-trans isomerization is not occurring in the presence of ZETAX.

Formulations 4 and 5 are based on formulations 1–6 in Table 2 of Example 1. Formulation 5 contains 2.00 pph ZETAX and formulation 4 is the control, containing neither butyl zimate nor ZETAX. The FTIR analysis shows that there is 28% trans-polybutadiene in control formulation 4, and 29% trans-polybutadiene in formulation 5. These results also show that cis-to-trans isomerization is not occurring in the present of ZETAX.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, the compositions of the present invention may be used in a variety of golf equipment, for example, golf shoes for sole applications, as well as in inserts for golf putters. Such modifications are also intended to fall within the scope of the appended claims.

We claim:

1. A golf ball comprising a reaction product wherein the reaction product comprises a resilient polymer component; a free radical source; and at least one of a metallic mercaptothiazole having the general formula I:

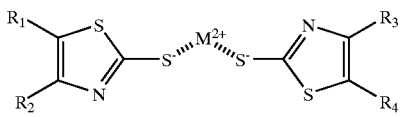

wherein $R_1$, $R_2$, $R_3$, and $R_4$ are each independently hydrogen, unsubstituted or substituted alkyl, unsubstituted or substituted cycloalkyl, unsubstituted or substituted aryl, unsubstituted or substituted heteroaryl, unsubstituted or substituted alkoxy, alkylester, amido, amino, cyano, thioalkyl, hydroxyl, halogen, aldehyde, or alkylcarbonyl; and M is selected from the group consisting of Zn, Cu, Ni, Co, Fe, Mn, Cr, V, Ti, Cd, Pd, Rh, Ru, Mo, Nb, Zr, Mg, Ca, Sr, Ba, Ge, Sn, Pb and Bi.

2. The golf ball of claim 1, wherein M is Zn, Cu, Mg, Ca, Sn, Mn, or Cd.

3. The golf ball of claim 1, wherein the metallic mercaptothiazole is zinc mercaptothiazole.

4. The golf ball of claim 1, wherein the metallic mercaptothiazole is present in an amount from about 0.01 pph to about 50 pph.

5. The golf ball of claim 4, wherein the metallic mercaptothiazole is present in an amount from about 1 pph to about 5 pph.

6. The golf ball of claim 1, the golf ball comprises one or more of a core, intermediate layer and cover, wherein the reaction product is disposed in at least a portion of the core, intermediate layer, cover, or a combination thereof.

7. The golf ball of claim 1, wherein the reaction product further comprises one or more crosslinking agent or filler.

8. The golf ball of claim 7, wherein the crosslinking agent is a metallic salt of an unsaturated acid monomer or monocarboxylic acid.

9. The golf ball of claim 8, wherein the metallic salt is selected from the group consisting of zinc acrylate, zinc diacrylate, zinc methacrylate, zinc dimethacrylate and mixtures thereof.

10. The golf ball of claim 9, wherein the crosslinking agent is zinc diacrylate.

11. The golf ball of claim 7, wherein the crosslinker is present from about 10 percent to about 50 percent of the resilient polymer component.

12. The golf ball of claim 11, wherein the crosslinker is present from about 20 pph to about 40 pph.

13. The golf ball of claim 6, wherein the cover comprises one or more homopolymeric or copolymeric cover materials selected from the group consisting of thermoset polyurethane, thermoplastic polyurethane, thermoset polyurea, thermoplastic polyurea, thermoset elastomer, thermoplastic elastomer and thermoplastic ionomer.

14. The golf ball of claim 1, wherein the golf ball core has an Atti compression of at least about 40.

15. The golf ball of claim 1, wherein the golf ball has a coefficient of restitution of at least about 0.78.

16. The golf ball of claim 1, wherein the golf ball has a ball spin rate of about 2500 rpm to about 4000 rpm when the golf ball is hit with a golf driver.

17. The golf ball of claim 1, wherein the golf ball has a ball spin rate of about 6,500 rpm to about 10,000 rpm when the golf ball is hit with an 8-iron.

18. The golf ball of claim 6, wherein the flexural modulus of the intermediate layer is about 2000 psi to about 200,000 psi and the flexural modulus of the cover is from about 5000 psi to about 100,000 psi.

19. The golf ball of claim 8, wherein the core has a hardness of about 15 Shore A or greater, the intermediate layer has a hardness of about 30 Shore D or greater, and the cover has a hardness of 70 Shore D or less.

20. The golf ball of claim 1, wherein the filler comprises at least one density adjusting filler.

21. The golf ball of claim 20, wherein the density adjusting filler is a metal powder or metal oxide, or foaming agent.

22. The golf ball of claim 1, wherein the resilient polymer is selected from the group consisting of a cis-polybutadiene, trans-polybutadiene, cis-isoprene, trans-isoprene, thermoplastic copolyester block copolymer; dynamically vulcanized thermoplastic elastomer; hydrogenated styrene-butadiene elastomer, non-hydrogenated styrene-butadiene elastomer; thermoplastic polyurethane; polymers made using a metallocene catalyst; ethylene propylenediene monomer; ethylene propylene rubber; or mixtures thereof.

23. The golf ball of claim 22, wherein the resilient polymer component comprises greater than 90% cis-polybutadiene.

24. The golf ball of claim 23, wherein the resilient polymer component comprises from about 95% to about 99% cis-polybutadiene.

25. The golf ball of claim 1, wherein the resilient polymer component has a Mooney viscosity from about 30 to about 120.

26. The golf ball of claim 1, wherein the reaction product further comprises a cis-to-trans catalyst.

27. The golf ball of claim 26, wherein the reaction product further comprises an accelerator to enhance the cis-to-trans catalyst.

28. The golf ball of claim 27, wherein the cis-to-trans catalyst is present in an amount from about 0.1 to about 25 parts per hundred of polybutadiene and the cis-to-trans catalyst is present in an amount from about 0.1 pph to about 100 pph.

29. The golf ball of claim 26, wherein the cis-to-trans catalyst is at least one of a metal-containing or nonmetal organosulfur component, a Group VIA component, an inorganic sulfide, or a substituted or unsubstituted aromatic organic compound.

30. The golf ball of claim 29, wherein the organosulfur component is 4,4'-diphenyl disulfide; 4,4'-diphenyl acetylene, 4,4'-ditolyl disulfide; 2,2'-benzamido diphenyl disulfide; bis(2-aminophenyl)disulfide; bis(4-aminophenyl) disulfide; bis(3-aminophenyl) disulfide, 2,2'-bis(4-aminonaphthyl)disulfide; 2,2'-bis(3-aminonaphthyl) disulfide; 2,2'-bis(4-aminonaphthyl)disulfide; 2,2'-bis(5-aminopthyl) disulfide; 2,2'-bis(6-aminonaphthyl) disulfide; 2,2'-bis(7-aminonapthyl) disulfide; 2,2'-bis(8-aminonaphthyl)disulfide; 1,1'-bis(2-aminonapthyl) disulfide; 1,1'-bis(3-aminonaphthyl)disulfide; 1,1'-bis(3-aminonapthyl) disulfide; 1,1'-bis(4-aminonaphthyl) disulfide; 1,1'-bis(5-aminonapthyl) disulfide; 1,1'-bis(6-aminonaphthyl)disulfide; 1,1'-bis(7-aminonapthyl) disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis (3,5-dichlorophenyl) disulfide; bis(2,4-dichlorophenyl)

disulfide; bis(2,6-dichlorophenyl)disulfide; bis(2,5-dibromophenyl)disulfide; bis(3,5-dibromophenyl)disulfide, bis(2-chloro-5-bromophenyl) disulfide; bis(2,4,6-trichlorophenyl)disulfide; bis(2,3,4,5,6-pentachlorophenyl) disulfide; bis(4-cyanophenyl)disulfide; bis(2-cyanophenyl) disulfide; bis(4-nitrophenyl)disulfide; bis(2-nitrophenyl) disulfide; 2,2'-dithiobenzojc ethyl; 2,2'-dithiobenzoic methyl; 2,2'-dithiobenzoic acid; 4,4'-dithiobenzoic ethyl; bis(4-acetylphenyl) disulfide; bis(2-acetylphenyl)disulfide; bis(4-formylphenyl)disulfide; bis(4carbamoylphenyl) disulfide; 1,1'-dinaphthyl disulfide; 2,2'-dinaphthyl disulfide; 1,2'-dinapthyl disulfide; 2,2'-bis(1-chlorodinaphthyl) disulfide; 2,2'-bis(1-bromonapthyl) disulfide; 1,1'-bis(2-chloronaphthyl)disulfide; 2,2'-bis(1-cyanonaphtyl) disulfide; 2,2'-bis(1-acetylnaphthyl)disulfide; and the like; or a mixture thereof.

31. The golf ball of claim 29, wherein the organosulfur component is 4,4'-diphenyl disulfide, 4,4'-ditolyl disulfide, or 2,2'-benzamido diphenyl disulfide, or a mixture thereof.

32. The golf ball of claim 29, wherein the organosulfur component is a compound of general formula III:

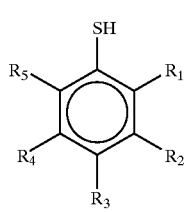

III where $R_1$–$R_5$ is selected from the group consisting of $C_1$–$C_8$ alkyl groups; halogen groups; thiol groups (—SH), carboxylated groups; sulfonated groups; and hydrogen.

33. The golf ball of claim 32, wherein the organosulfur component is selected from the group consisting of pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and zinc salts thereof.

34. The golf ball of claim 29, wherein the at least one organosulfur component is substantially free of metal.

35. The golf ball of claim 29, wherein the inorganic sulfide component is selected from the group consisting of sulfide analogs of titanium, manganese, iron, calcium, cobalt, molybdenum, tungsten, copper, selenium, yttrium, zinc, tin, strontium, barium, vanadium, chromium, nickel, copper, zinc, cadmium, and bismuth.

36. The golf ball of claim 29, wherein the metal-containing organosulfur component is a metal analog of diethyldithiocarbamate, diamyldithiocarbamate, dimethyldithiocarbamate, or mixtures thereof, wherein the metal is cadmium, copper, lead, tellurium, zinc, tin, nickel, paladium, platinum, titanium, vanadium, chromium, or zirconium.

37. The golf ball of claim 29, wherein the substituted or unsubstituted aromatic organic compound has the formula $(R_1)_x$—$R_3$—M—$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M is an azo group, acetylene group, or a metal component.

38. A method of manufacturing golf balls comprising:
providing a core;
optionally providing an intermediate layer disposed outside the core; and
providing at least one cover over the core and optional intermediate layer,
wherein at least one of the cover, the core, and the optional intermediate layer comprises at least one layer formed from a reaction product wherein the reaction product comprises a resilient polymer component; a free radical source; and at least one of a metallic mercaptothiazole having the general formula I:

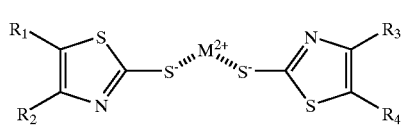

I wherein $R_1$, $R_2$, $R_3$, and $R_4$ are each independently hydrogen, unsubstituted or substituted alkyl, unsubstituted or substituted cycloalkyl, unsubstituted or substituted aryl, unsubstituted or substituted heteroaryl, unsubstituted or substituted alkoxy, alkylester, amido, amino, cyano, thioalkyl, hydroxyl, halogen, aldehyde, or alkylcarbonyl; and M is selected from the group consisting of Zn, Cu, Ni, Co, Fe, Mn, Cr, V, Ti, Cd, Pd, Rh, Ru, Mo, Nb, Zr, Mg, Ca, Sr, Ba, Ge, Sn, Pb and Bi.

39. A golf ball having at least one layer that includes a reaction product comprising a resilient polymer component having polybutadiene; a free radical source; zinc pentachlorothiophenol; and zinc mercaptothiazole.

40. The method of claim 38, wherein the intermediate layer has a hardness of about 30 Shore D or greater and a flexural modulus of about 2000 psi to about 200,000 psi.

41. The golf ball of claim 39, wherein the zinc pentachlorothiophenol is present in an amount of at least abut 1.5 pph.

42. The golf ball of claim 39, wherein the zinc mercaptothiazole is present in an amount of about 0.01 pph to about 50 pph.

* * * * *